United States Patent [19]

Ikegami et al.

[11] Patent Number: 4,755,809
[45] Date of Patent: Jul. 5, 1988

[54] METHOD FOR CONTROLLING WINDOWS DISPLAYED IN A CARD IMAGE DATA PROCESSING SYSTEM

[75] Inventors: Yoshiki Ikegami, Inagi; Yoshio Hayakawa, Kawaguchi, both of Japan

[73] Assignee: Fujitsu Limited, Kawasaki, Japan

[21] Appl. No.: 540,640

[22] Filed: Oct. 11, 1983

[30] Foreign Application Priority Data

Oct. 11, 1982 [JP] Japan ................. 57-177806
Oct. 11, 1982 [JP] Japan ................. 57-177805

[51] Int. Cl.⁴ ............................................. G09G 1/16
[52] U.S. Cl. ................................. 340/724; 340/709; 340/726; 340/751
[58] Field of Search ............... 340/724, 726, 734, 709, 340/723, 750, 798, 799, 800, 801, 731, 751

[56] References Cited

U.S. PATENT DOCUMENTS

| | | | |
|---|---|---|---|
| 3,566,361 | 2/1971 | Laverju et al. | 340/709 |
| 3,903,510 | 9/1975 | Zobel | 340/709 |
| 4,101,879 | 7/1978 | Kawaji et al. | 340/750 |
| 4,383,296 | 5/1983 | Sander | 340/726 |
| 4,386,410 | 5/1983 | Pandya et al. | 340/716 |
| 4,428,065 | 1/1984 | Duvall et al. | 340/731 |

OTHER PUBLICATIONS

Williams, Gregg; "The Lisa Computer System," *Byte*, Feb. 1983, pp. 33–50.
Duff, Charles; "Introducing the Macintosh," copyright 1984, McGraw-Hill Inc.

*Primary Examiner*—Marshall M. Curtis
*Attorney, Agent, or Firm*—Staas & Halsey

[57] ABSTRACT

A method for controlling a plurality of windows for displaying card images wherein the card images are arranged lengthwise on a display unit. In the case where there is a window above an active window, there is a cursor displayed in the active window, the cursor is moved up and a down-scrolling operation is performed upon the active window until the first row of a card image reaches the row immediately above the boundary row between the windows. If the cursor is moved further up, the boundary row is moved up. Similarly, in the case where there is a window below an active window, the cursor is moved down and an up-scrolling operation is performed upon the active window until the bottom row of a card image reaches a row immediately below the boundary row. If the cursor is further moved down, the boundary row is moved down.

6 Claims, 31 Drawing Sheets

Fig. 1

| CUSTOMER CARD | | YR MO DAY |
|---|---|---|
| | CUSTOMER NO. ‿‿‿‿‿‿‿‿ | |

| CUSTOMER'S NAME | . . . . . . . . . . . . . . . . . . |
|---|---|
| ADDRESS | . . . . . . . . . . . . . . . . . .<br>. . . . . . . . . . . . . . . . . . |
| PHONE | . . . . . . . . . . . . . . . . . . |
| AGE | ‿‿‿‿ |
| NAME | . . . . . . . . . . . . . . . . . . |

Fig. 2

DELIVERY OF GOODS

| YR | MO | DAY | NAME |
|----|----|-----|------|
| nn | nn | nn  | .    |

MESSERS. FUJITSU TRADING

| ARTICLE | QUANTITY | UNIT PRICE | AMOUNT |
|---------|----------|------------|--------|
| . . . . . . | nnnnnnnn | nnnn | nnn,nnn,nnn |
| . . . . . . | nnnnnnnn | nnnn | nnn,nnn,nnn |
| . . . . . . | nnnnnnnn | nnn,nnn | nnn,nnn,nnn |
| . . . . . . | nnnnnnnn | nnn,nnn | nnn,nnn,nnn |
| . . . . . . | | nnn,nnn | nnn,nnn,nnn |
| | | TOTAL | nnnn,nnn,nnn |

Fig. 4

① BILL

BILL

ADDRESS : KAMIODANAKA, KAWASAKI, KANAGAWA

NAME    : TARO FUJITSU

PLEASE ACKNOWLEDGE THE FOLLOWING BILL.

| PREVIOUS BILL | PAYMENT | CLAIMED PAYMENT |
|---|---|---|
| ууууу | ууууу | ууууу |

② RECEIPT SLIP

RECEIPT SLIP

NAME : TARO FUJITSU

| MO | DUE | PAYMENT | CLAIMED PAYMENT |
|---|---|---|---|
| 1 | 5000 | 0 | 5000 |
| 2 | 5000 | 0 | 10000 |
| 3 | | | |
| 4 | | | |

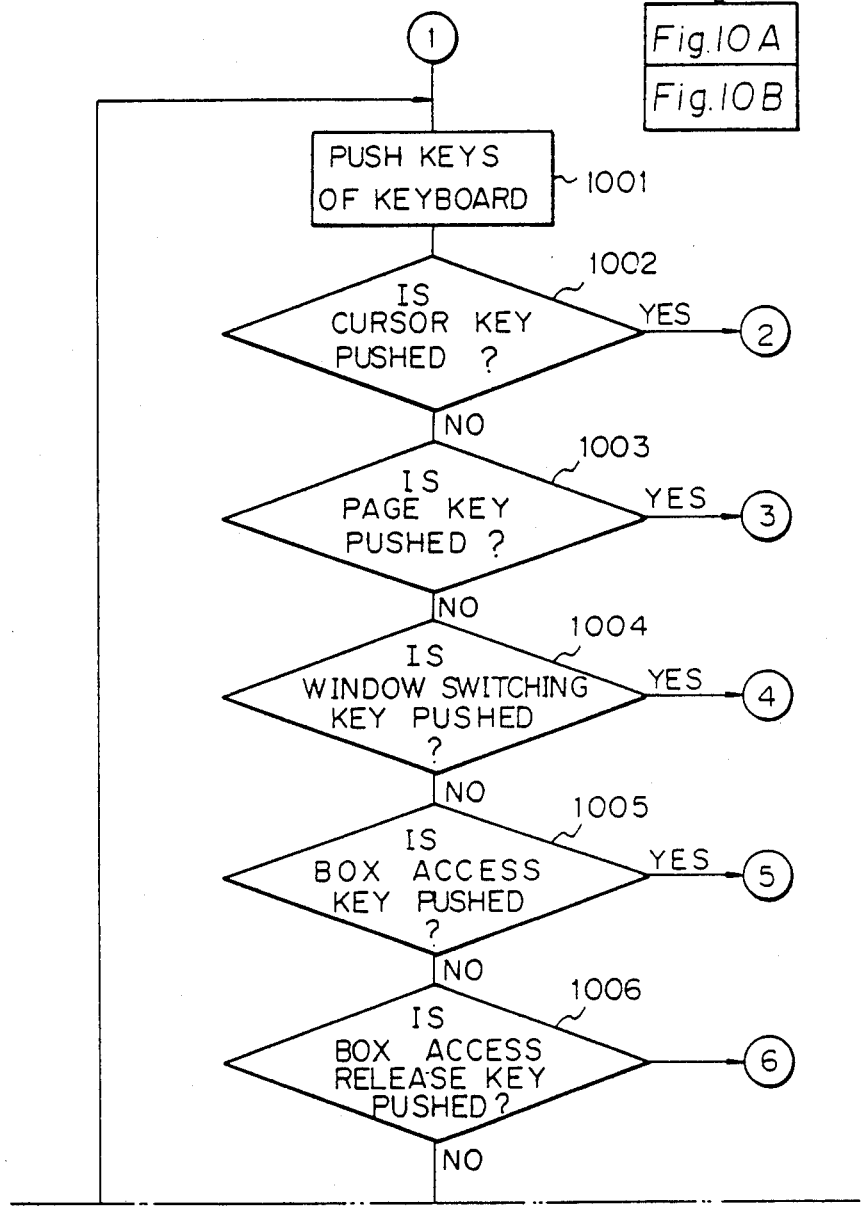

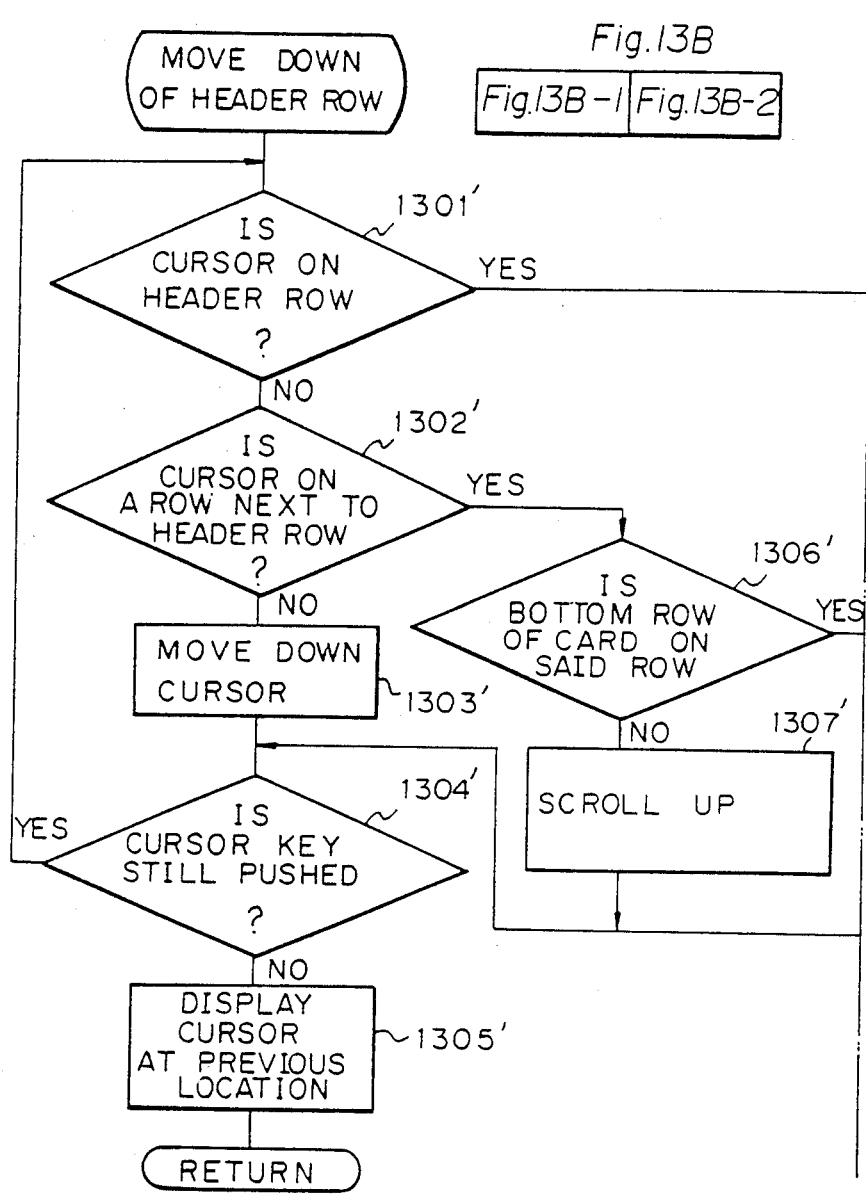

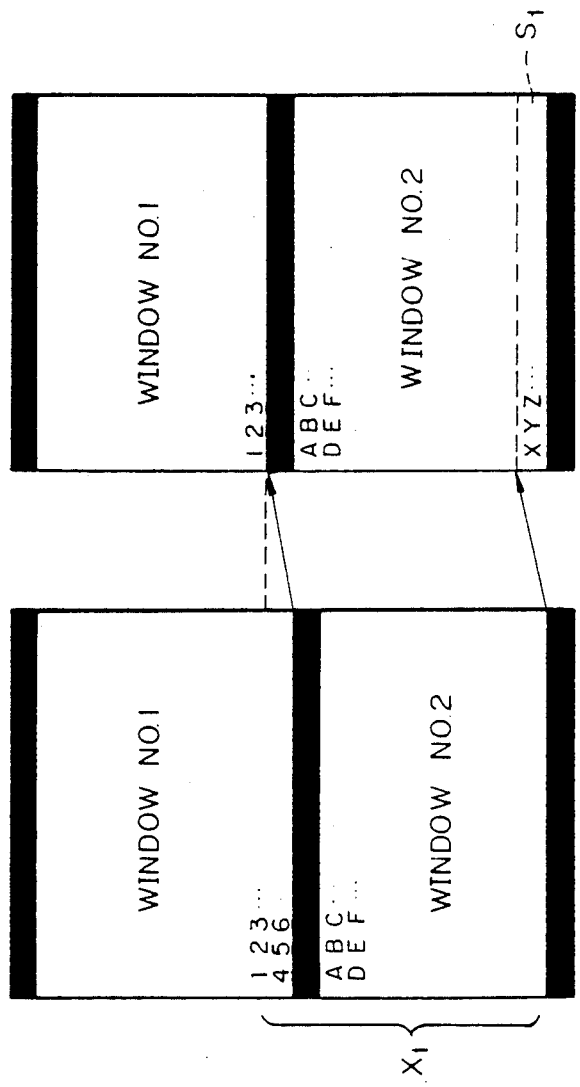

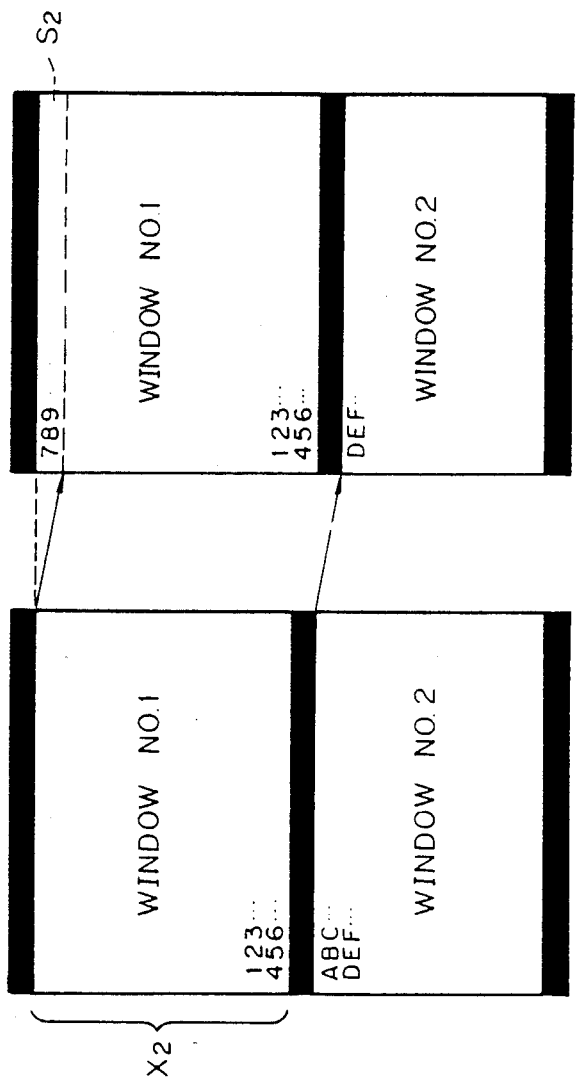

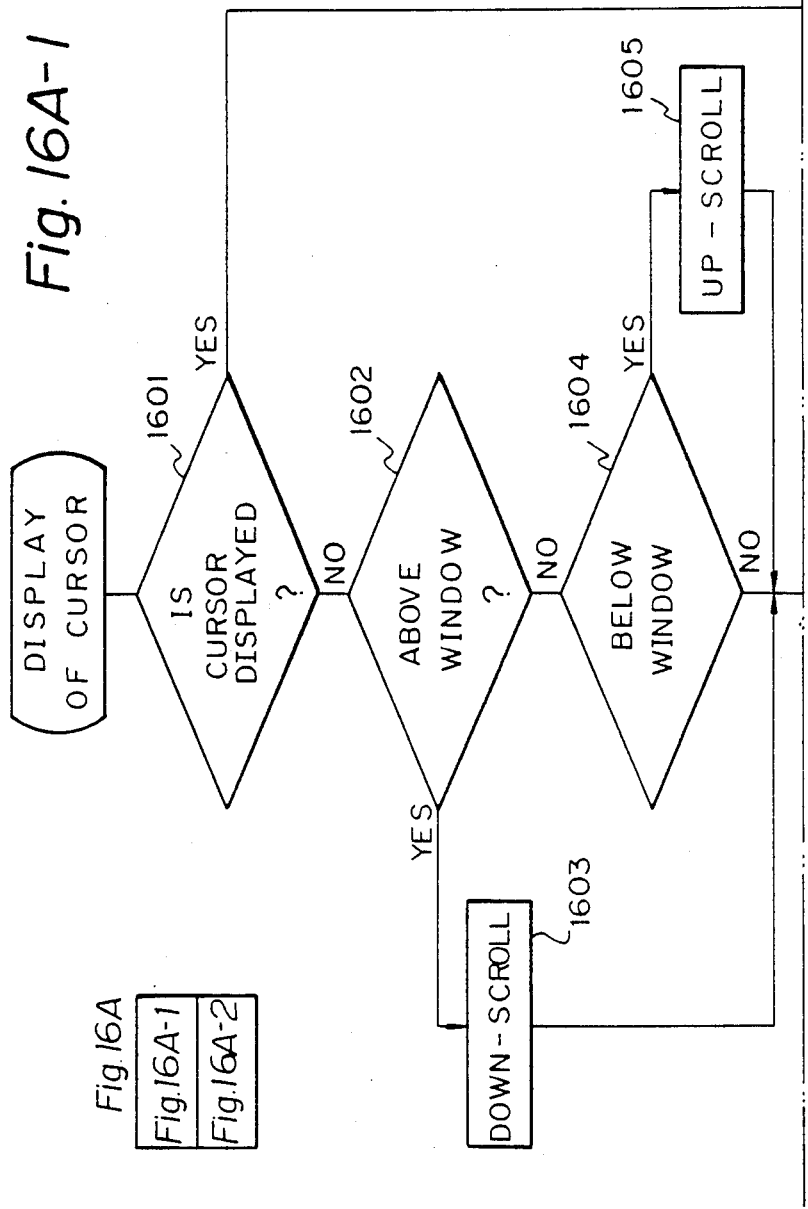

METHOD FOR CONTROLLING WINDOWS DISPLAYED IN A CARD IMAGE DATA PROCESSING SYSTEM

BACKGROUND OF THE INVENTION

1. Field of the Invention

The present invention relates to a method for controlling a plurality of card images, i.e., "windows", displayed in a card image data processing system.

2. Description of the Prior Art

In usual offices, office workers store information in physical card systems. That is, they write the information on to cards and store the cards in filing boxes.

The development of word processing, however, has made possible electronic card systems wherein information is stored on card images in a floppy disk or other memory medium, thereby enhancing office efficiency. In such a system, a card image is displayed on a display unit and information is added thereon.

A card image is comprised of common card mode data for a plurality of card images, such card images with common card mode data being considered a "box", and individual card data for each card image.

In some systems, a plurality of card images belonging to different boxes are simultaneously displayed on the display unit and successively processed. It is desired to enlarge a card image, i.e., a window for displaying each processed card mode data. Note that, in the prior art, when enlarging a card image, it is usually necessary to push a series of keys—a relatively complex operation which increases the amount of work.

Also, it is desired to easily scroll a processed window, i.e., an active window. Note that an "active window" is a window in which a cursor is displayed. In the prior art, a scrolling operation is performed on the entire display picture including an active window.

SUMMARY OF THE INVENTION

It is a principal object of the present invention to provide a method for controlling a plurality of card images, i.e., windows, in a card image data processing system, in which it is easy to enlarge the windows.

It is another object of the present invention to provide a method for controlling such a plurality of windows, in which a processed window, i.e., an active windows can be easily scrolled.

According to the present invention, in the case where there is a window above an active window and the cursor is moved up, a down-scrolling operation is performed upon the active window. This down-scrolling operation continues until the first row of a card image reaches a row immediately below the boundary row between the windows. If the cursor is then moved further up, the boundary row is moved up. Similarly, in the case where there is a window, below an active window and the cursor is moved down, an up-scrolling operation is performed upon the active window. This up-scrolling operation continues until the bottom row of a card image reaches a row immediately above the boundary row between the window. If the cursor is then moved further down, the boundary is moved down.

BRIEF DESCRIPTION OF THE DRAWINGS

The present invention will be more clearly understood from the description as set forth below with reference to the accompanying drawings, wherein:

FIGS. 1 and 2 show examples of card images according to the present invention;

FIG. 4 is an example of a display picture for explaining the principle of the present invention;

FIGS. 10A, 10B, and 11 are flowcharts of the operation of the system of FIG. 5;

FIGS. 12, 13A-1, 13A-2, 13B-1, and 13B-2 are detailed flowcharts of steps in FIG. 12;

FIGS. 13C, 13D, 13E, and 13F are diagrams supplementing the flowcharts of FIGS. 13A and 13B;

FIGS. 16A-1 and 16A-2 are a detailed flowchart of a step of FIG. 15;

DESCRIPTION OF THE PREFERRED EMBODIMENTS

In the present invention, information having a predetermined format is stored as a card image in a card image data processing system. During processing, this card image is displayed on a display unit.

A card image is formed by common form data, i.e., blank form data, and individual card data. The common blank form data and individual card data are stored separately in memory units or floppy disks and are merged and displayed on the display unit as occasion demands.

Figures 1, 13A:
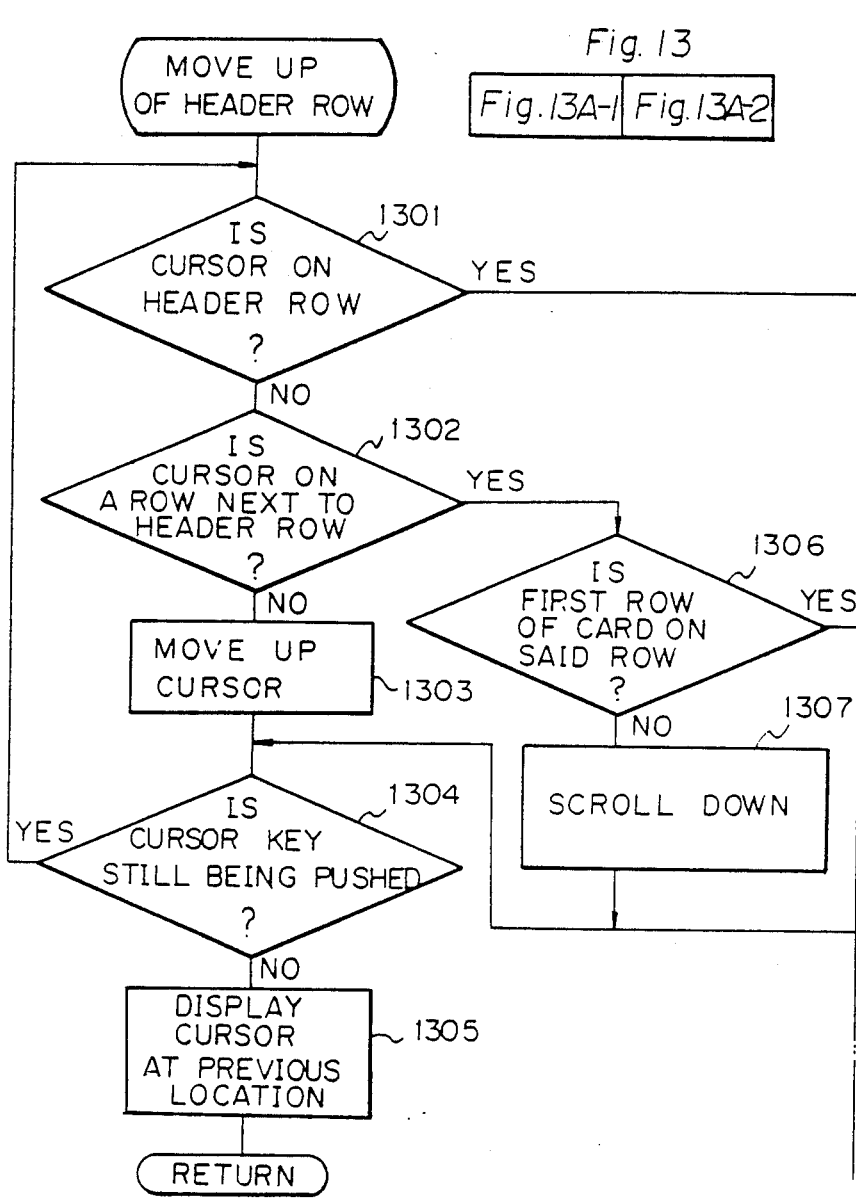
Figures 2, 13A:
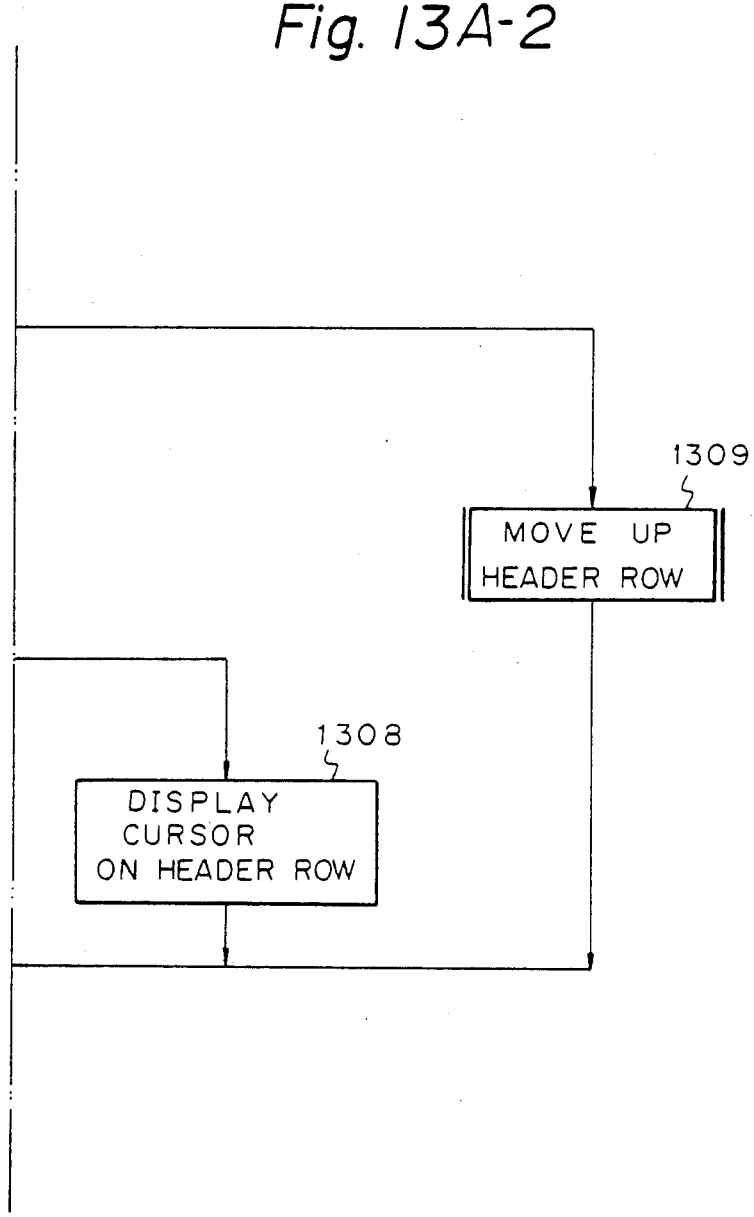

In FIGS. 1 and 2, which illustrate examples of blank forms, ". . . " indicates a "character field" in which letters and other characters may be inserted, and "ᴜᴜᴜ, ᴜᴜᴜ" indicates a "numeric field" in which numerals may be inserted.

A card image is comprised of common card mode data (blank form data) for all the card images belonging to a box and individual card data (field data). The common card mode data is comprised of, for example, a title "CUSTOMER CARD", field names "CUSTOMER NO.", "CUSTOMER'S NAME", "ADDRESS", "PHONE", "AGE", "NAME", and the like, while the individual card data is inserted in the places indicated by marks ". . . " and, "ᴜᴜᴜ ᴜ", as illustrated in FIG. 1.

Figure 3:
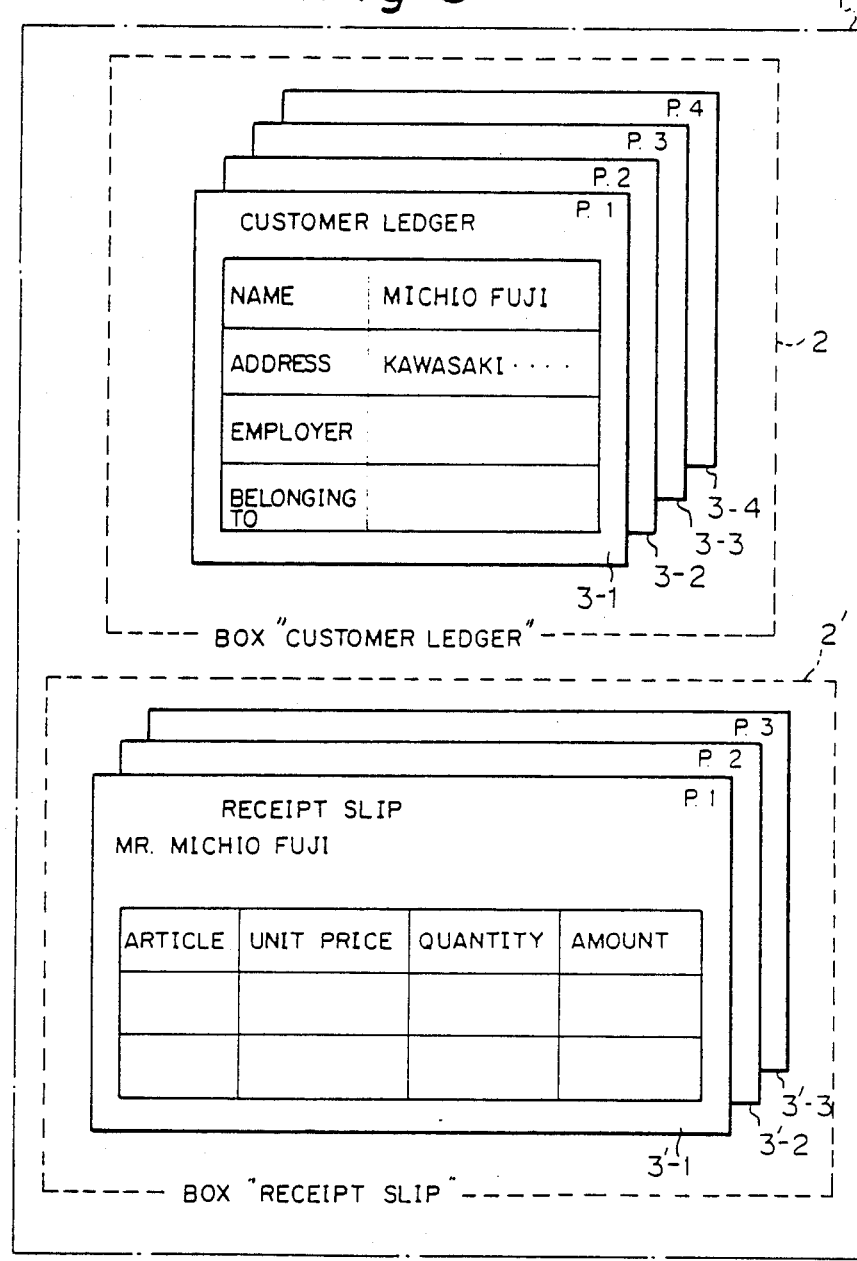
FIG. 3 shows examples of boxes according to the present invention.

Since the number of card images having a common format, as illustrated in FIG. 1 or 2, is generally large, the concept of a "box" is introduced. FIG. 3 illustrates examples of boxes according to the present invention. In FIG. 3, numeral 1 designates a floppy disk, numerals 2 and 2' designate boxes, and numerals 3-1, 3-2, ..., 3'-1, 3'-2, ... designate card images. In order to process a group of card images as a box, the following tables (or memory units) are prepared, (i) Box profile table for storing box number, box name, lines, and the like.

(ii) Field definition information table for storing start coordinates of fields, attributes such as the presence or absence of a comma, and the like.

(iii) Field name table for storing names of fields.

(iv) Card data table for storing card data which will be written into the above-mentioned fields with a page number.

A card image is made by combining the contents of the above-mentioned tables.

In FIG. 4, which illustrates a display picture for explaining the principle of the present invention, the picture is divided into two windows 41 and 42. In the window 41, a card image of page 7 of a box "BILL" is displayed. Page 7 of the box "BILL" is used for Mr. TARO FUJITSU. In the window 42, a card image of page 7 of a box "RECEIPT SLIP" is displayed. Page 7 of the box "RECEIPT SLIP" is also used for Mr. TARO FUJITSU. Therefore, various operations can be performed upon the card data of the window 41 and that of the window 42, e.g., retrieval operations, sort operations, and statistical operations.

When processing the card data displayed in the window 41, a cursor (not shown) is displayed in the window 41. No cursor is displayed in the window 42. The card images of the windows 41 and 42 can be independently scrolled by moving the cursor. Further, the windows 41 and 42 can be enlarged or reduced by moving the cursor. Of course, in this case, when the window 41 is enlarged, the window 42 is reduced.

Switching of a page of a card image displayed in the window 41 or 42 is performed within the same box by using page keys. Switching of an active window is performed by using a window switching key.

In FIG. 4, numerals 43, 44, and 45 designate boundary rows. The boundary rows 43 and 44 are called header rows, since box numbers, box names, and page numbers are displayed thereon.

Figure 5:
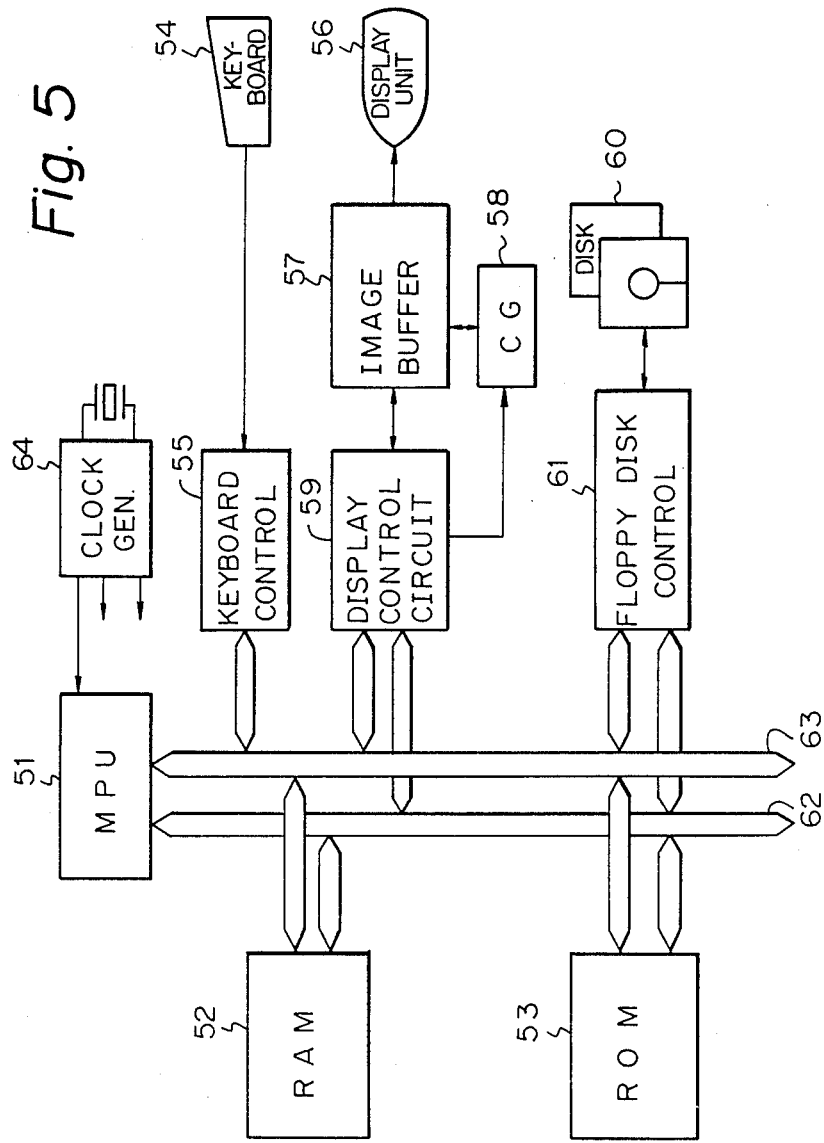
FIG. 5 is a block diagram of a card image data processing system according to the present invention.

In FIG. 5, which illustrates a card image data processing system according to the present invention, reference numeral 51 designates a microprocessor unit (MPU); 52 a RAM for storing temporary data; 53 a read-only memory (ROM) for storing programs, constants, and the like; 54 a keyboard; 55 a keyboard control circuit; 56 a display unit (36 rows×48 columns); 57 an image buffer for storing the content of the display unit 56; 58 a character generator; 59 a display control circuit; 60 floppy disks; 61 a floppy disk control circuit; 62 an address bus; 63 a data bus; and 64 a clock generator for supplying clock signals to the MPU 61 and the like.

Figure 6A:
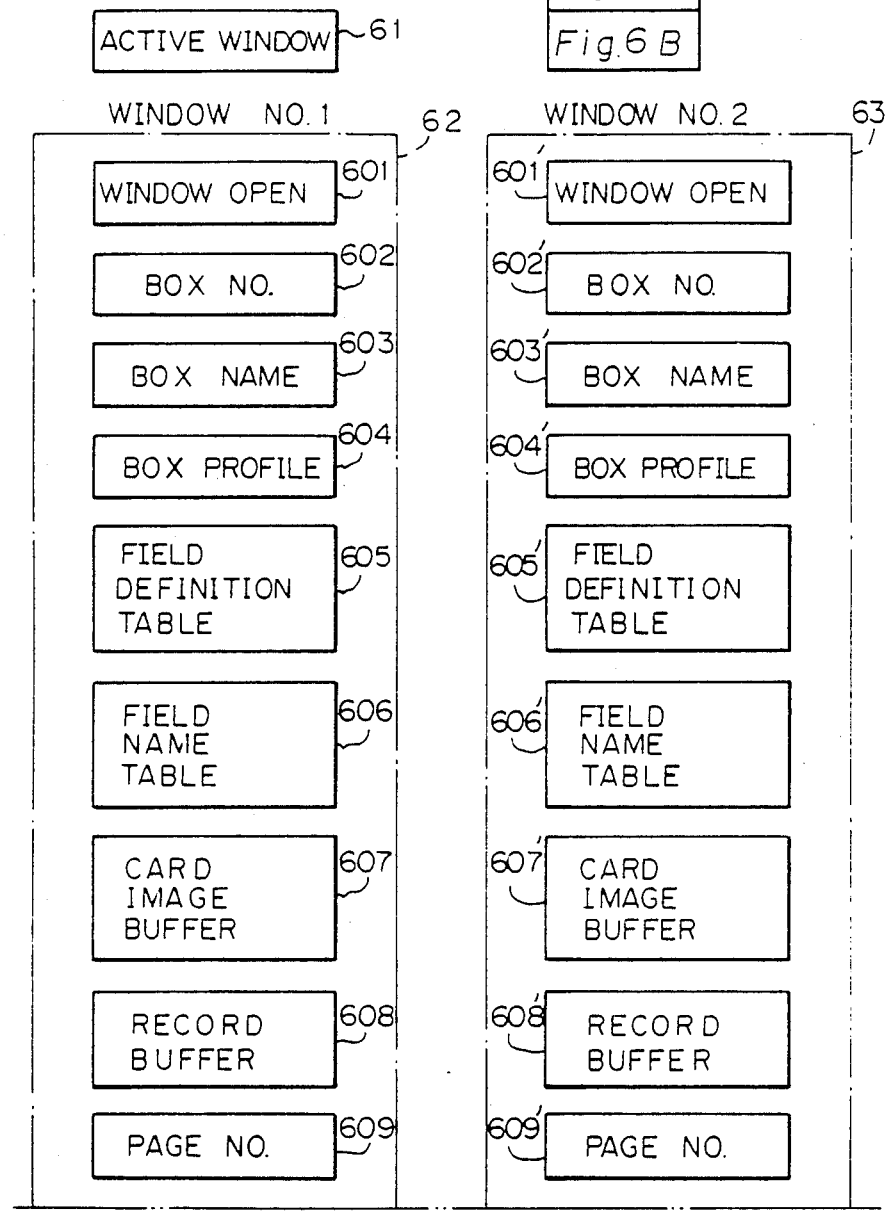
FIGS. 6A and 6B are a detailed block diagram of a random-access memory (RAM) of FIG. 5.

In FIG. 6, which is a detailed block diagram of the RAM 52, numeral 61 designates an active window number area for activating the window No. 1 or 2 (corresponding to the window 41 or 42), 62 an area for the window NO. 1, and 63 an area for the window NO. 2. Note, however, that the number of areas such as 62 and 63, i.e., the number of windows, can be more than two.

The areas 62 and 63 will be explained in more detail. Each of the areas 62 and 63 comprises a window open area 601 (601'), a box number area 602 (602'), a box name area 603 (603'), a box profile information area 604 (604'), a field definition information table area 605 (605'), a field name table 606 (606'), a card image buffer area 607 (607') (60 rows×96 columns) for storing card image data, a record buffer area 608 (608') for storing card data, a page number area 609 (609'), and a display picture control information area 610 (610'). The contents of the field definition information area 605, the field name table 606, and the record buffer 608 are merged into the card image buffer area 607, thereby creating a page of card image.

Note that, when the current data in the area 62 or 63 is no longer needed, it is transmitted to the floppy disks 60. In place of this, new data for another box is loaded into the area 62 or 63. That is, switching of a box is performed.

Figure 6B:
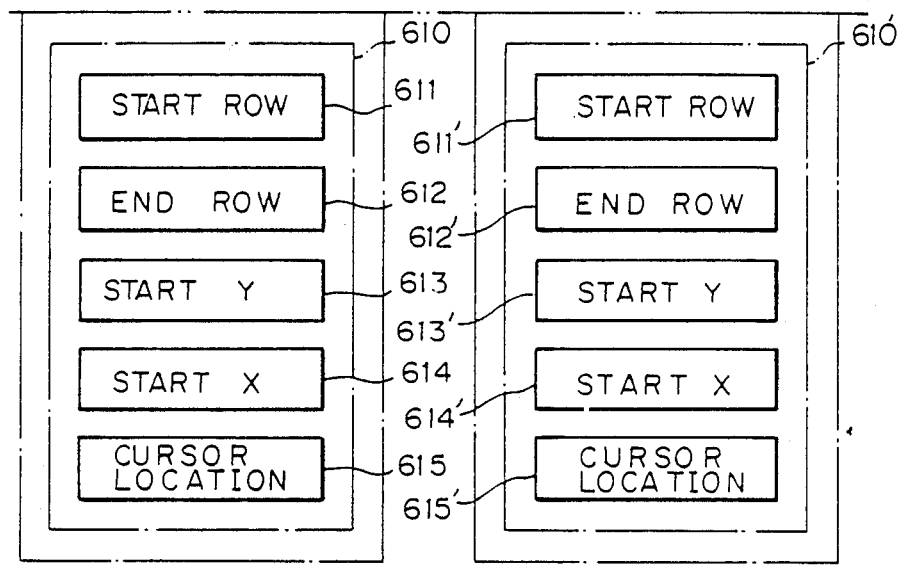

The display picture control information area 610 (or 610') comprises five areas 611 (or 611') through 615 (or 615') (See FIG. 6B). The area 611 stores the start row (absolute coordinates) of a window assigned to a box on the display picture which has, for example, 36 rows (see FIG. 8B). The area 612 stores the end row (absolute coordinates) of the assigned window on the display picture. Note that "absolute coordinates" means the coordinates on the display picture. The area 613 stores the Y-coordinate (relative coordinates) of the displayed part of a card image, and the area 614 stores the X-coordinate (relative coordinates) of the displayed part of the card image. Note that "relative coordinates" means the coordinates on the card image, such as the X- and Y-coordinates shown in FIG. 8D, in which an area A designates the displayed part of a card image. The area 615 stores a cursor location, i.e., the relative coordinates of a cursor on the card image. When a box is activated by the value of the active window area 61, the relative coordinates of the cursor location, in the activated box, are transformed to the absolute coordinates of the display picture in which the cursor is located.

The operation of the card image data processing system of FIG. 5 will now be explained with reference to FIGS. 7 through 22. First, at step 701, the MPU 51 selects a box from the floppy disks 60. Then, at step 702, the MPU 51 opens the selected box, i.e., the MPU 51 loads the box number, the box name, the box profile information, the field definition information, the field name information, and the card data from the floppy disks 60 to the areas 602, 603, 604, 605, 606, and 608, respectively, of the window NO. 1 area 62 (or the window NO. 2 area 63). In this case, the transfer of card data between the record buffer area 608 and the floppy disks 60 is preferably performed with blocks (corresponding to a plurality of pages of card data) rather than with individual records (corresponding to one page of card data). In addition, the field region of the card image buffer area 607 remains cleared.

At step 703, the MPU 51 searches for a first page of card data in the record buffer area 608. Then, at step 704, the MPU 51 transfers the searched first page of card data from the record buffer area 608 to the field area of the card image buffer area 607. Simultaneously, the MPU 51 writes "1" into the page number area 609.

In the first part of step 704 card data is written into "independent fields" which have independent attributes, such as character or numeric fields, and the lengths of the fields. In this case, card data is converted into a code which is written into a numeric field, while card data is written without any conversion into a character field. Then after completing the writing of card data into all the independent fields, card data is written into "repeated fields" which have the same attributes as the first row within the repeated fields.

Next, at step 705, the MPU 51 sets up a flag in the window open area 601 thereby opening the window NO. 1, which will be explained in more later. At step 706, the MPU 51 writes the box number, the box name, and the page number (in this case, "1") into the header row area of the image buffer 57, thereby displaying the box number, the box name, and the page number in the header row.

At step 707, the MPU 51 writes the contents of the card image buffer area 607 into the image buffer 57 so as to display the content of the card image buffer area 607. Of course, in this case, only part of the contents of the card image buffer area 607 is displayed, since the card image buffer area (60 rows×96 columns) is larger than the image buffer 57, i.e., the display picture area (36 rows×48 columns).

At step 708, the MPU 51 writes the relative coordinates of the first field of the card image buffer area 607 into the cursor location area 615. As a result, the relative coordinates of the first field of the card image buffer are transformed into the absolute coordinates of the image buffer area 57 so as to display the cursor in the corresponding place. Control is then transferred to step 1001 of FIG. 10.

Figure 7:
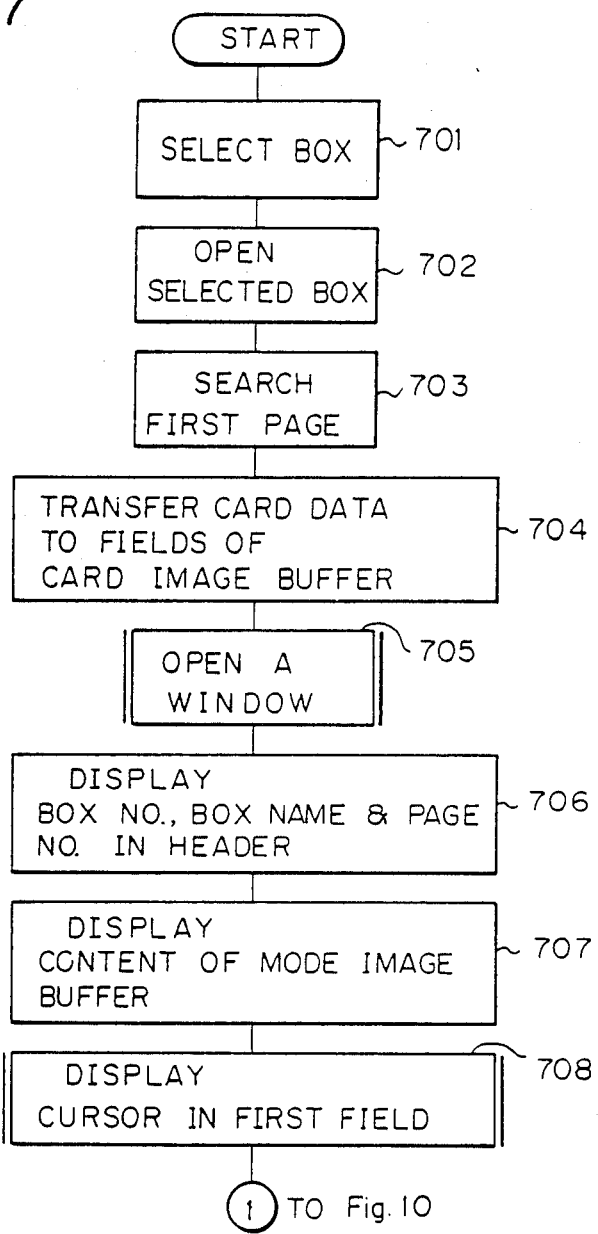
FIG. 7 is a flowchart of the operation of the system of FIG. 5.
Figure 8A:
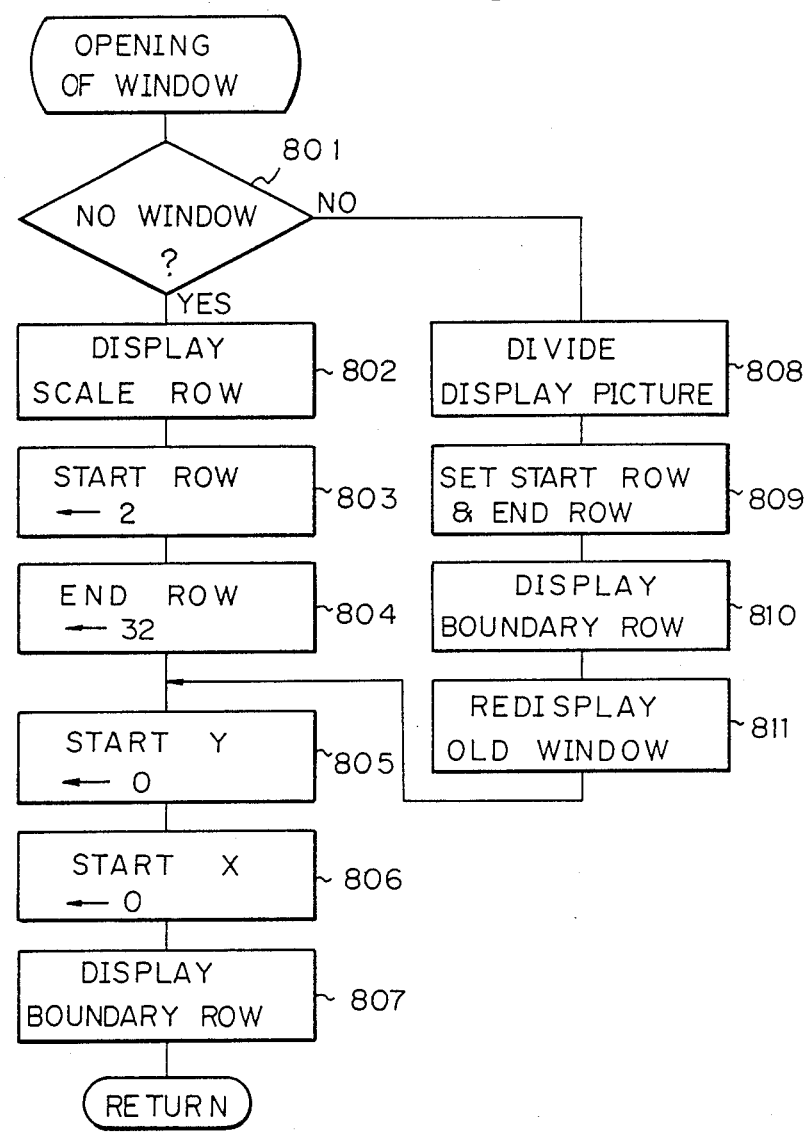
FIG. 8A is a detailed flowchart of a step in FIG. 7.
Figure 8B:
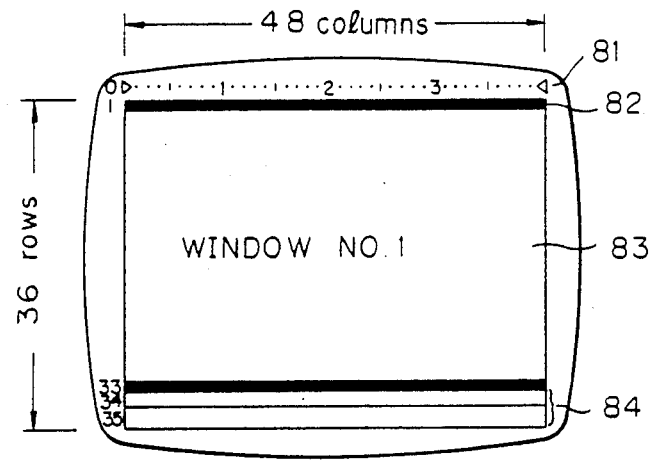
FIGS. 8B, 8C, and 8D are diagrams supplementing the flowchart of FIG. 8A.

The step 705 of FIG. 7 will be explained with reference to FIGS. 8A through 8D. At step 801 of FIG. 8A, the MPU 51 determines whether or not there is a window in the image buffer 57, i.e., in the display unit 56. If there is no window, the MPU 51 searches the window open areas 601 and 601'. If there is a window, control is transferred to step 802 in which the MPU 51 writes a scale code into the first row of the image buffer 57, thereby displaying a scale row 81 as illustrated in FIG. 8B. Then, at step 803, the MPU 51 writes "2" into start row area 611 and, at step 804, writes "32" into the end row area 612. As a result, a window NO. 1 area 83 is established as illustrated in FIG. 8B. Then, control is transferred to step 805.

Figure 8C:
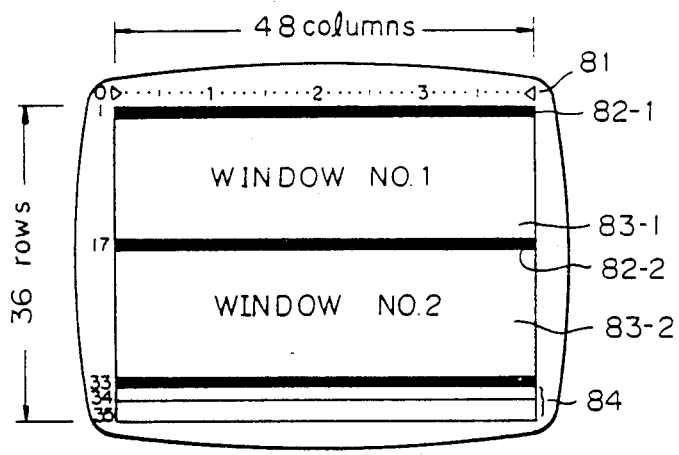

If the determination at step 801 is negative, control is transferred to step 801, in which the MPU 51 divides the window area into a plurality of areas, for example, two window areas 83-1 and 83-2 as illustrated in FIG. 8C. At step 809, the MPU 51 sets the start and end rows of each window. That is, the MPU 51 writes "2" and "16" into the start row area 611 and the end row area 612, respectively, and writes "18" and "32" into the start row area 611' and the end row area 612', respectively. Next, at step 810, the MPU 51 writes a boundary row code (in this case, a header row code) into the 17-th row of the image buffer 57, thereby displaying a boundary row 82-2 as illustrated in FIG. 8C. Then, at step 811, the MPU 51 writes the content of the old card image buffer area 607' into the area of the image buffer 57 corresponding to the area 83-2 of FIG. 8C. Control is then transferred to step 805.

Figure 8D:
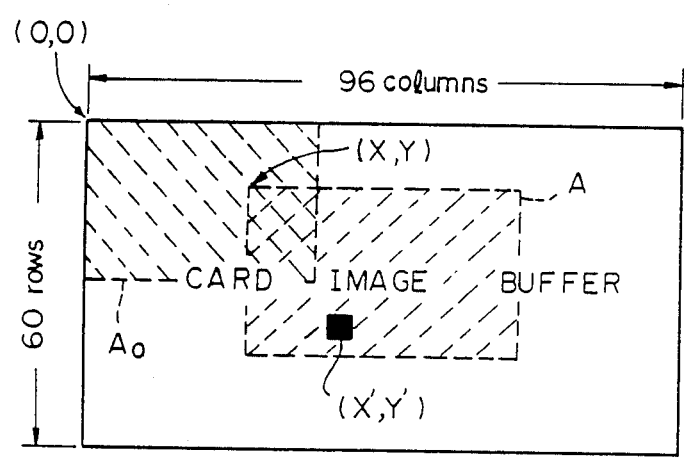

At step 805, the MPU 51 writes "0" into both the start Y- and X-areas 613 and 614, thereby displaying the initial area of the card image buffer area 607 as indicated by $A_0$ in FIG. 8D. Then, at step 807, the MPU 51 writes boundary codes into the 1st and 33-rd rows of the image buffer 57, thereby displaying the boundary rows 82 (or 82-1) and 84 as illustrated in FIGS. 8B and 8C. Thus, the routine of FIG. 8A is completed.

Figure 9:
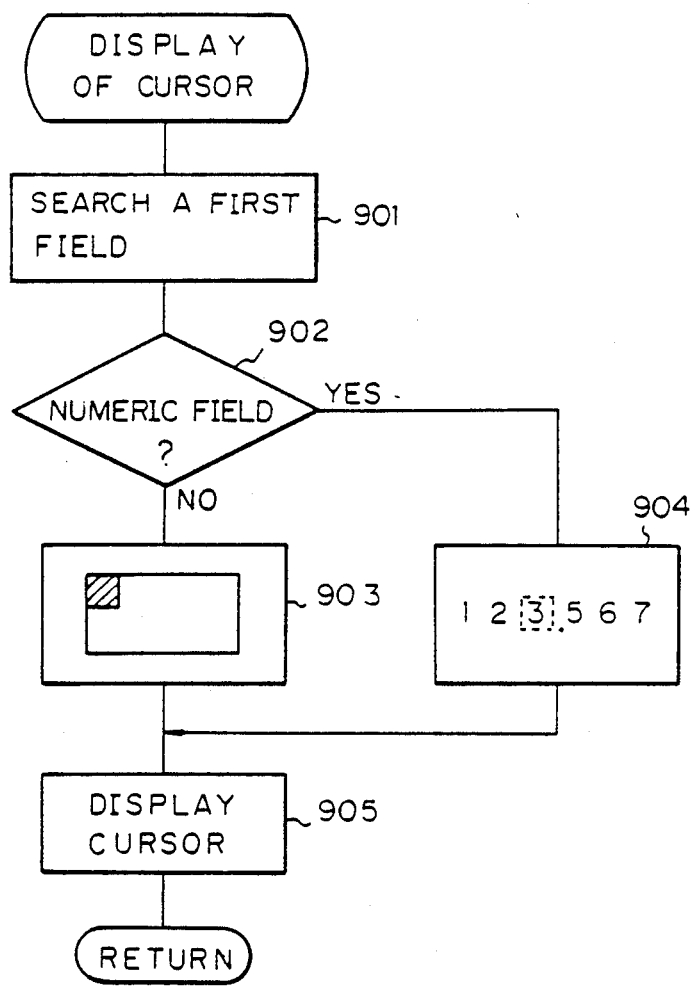
FIG. 9 is a detailed flowchart of a step in FIG. 7.

The step 708 of FIG. 7 will be explained in more detail with reference to FIG. 9. At step 901, the MPU 51 searches the field definition information table area 605 to find the first field, i.e., the field having the smallest coordinates. Then, at step 902, the MPU 51 determines whether the first field is a numeric field or a character field. If the first field is a character field, control is transferred to step 903, in which the MPU 51 writes the first relative coordinates of the start field into the cursor location area 615. As a result, at step 905, the relative coordinates of the cursor are transformed into absolute coordinates so that the cursor is displayed at the top and left side of the first field. If the start field is a numeric field, control is transferred to step 904, in which the MPU 51 writes the relative coordinates of the first digital place of the numeric field into the cursor location area 615. As a result, at step 905, the relative coordinates are transformed into absolute coordinates so that the cursor is displayed at the first digital place of the numeric field.

Note that the transformation between the relative coordinates of the card image buffer area and the absolute coordinates of the image buffer 57 is performed by using the content of the start row area 611 (611'), the end row area 612 (612'), the start Y-coordinate area 613 (613'), and the start X-coordinate area 614.

The routine or the steps in the flowchart of FIG. 10 will now be explained. At step 1001, a key or keys are pushed. As a result, the next operation will be performed in accordance with the pushed keys. At step 1002, the MPU 51 determines whether or not a cursor key is pushed. If a cursor key is pushed or activated, control is transferred to step 1101 of FIG. 11, which moves the cursor. The step 1101 will be later explained in detail. Next, at step 1102, the MPU 51 determines whether or not the cursor is directed upward. If the cursor is directed upward, at step 1103, the MPU 51 determines whether or not there was an upper field at step 1101. That is, at step 1101, the cursor was going to an upper field. If, however, there is no upper field, the cursor remains in the same place and control is transferred to step 1104, in which the MPU 51 determines whether or not there is a window above an active window in which the cursor is displayed. If the determination at step 1103 or 1104 is that there is an upper field, control returns to step 1001 of FIG. 10. If the determination at step 1104 is affirmative, control is transferred to step 1105, in which the subroutine of FIG. 13A is performed. Thus, control returns to step 1001 of FIG. 10.

If the determination at step 1102 is negative, control is transferred to step 1106, in which the MPU 51 determines whether or not the cursor is directed downward. If the cursor is directed downward, at step 1107, the MPU 51 determines whether or not there was a lower field at step 1101. That is, at step 1101, the cursor was going to a lower field. If, however, there is no lower field, the cursor remains in the same place and control is transferred to step 1108, in which the MPU 51 determines whether or not there is a window below an active window in which the cursor is displayed. If the determination at step 1106, 1107, or 1108 that there is a lower field, control returns to step 1001 of FIG. 10. If the determination at step 1108 is affirmative, control is transferred to step 1109, in which a subroutine of FIG. 13B similar to that of FIG. 13A is performed. Thus, control returns to step 1101 of FIG. 10.

Step 1101 of FIG. 11 will now be explained in more detail with reference to FIG. 12. At step 1201, the MPU 51 determines whether or not the cursor is presently in a character field. If the cursor is in a character field, control is transferred to step 1207, in which the MPU 51 moves the cursor along the character field. As a result, at step 1208, the MPU 51 determines whether or not the cursor is outside of the character field. If the cursor is moved outside of the character field, control is transferred to step 1202. If the cursor remains within the character field, control is transferred to step 1210.

At step 1202, the MPU 51 searches for a field along the motion direction of the cursor. In this case, the MPU 51 searches the field definition information table area of an active window. As a result of the search of step 1202, the MPU 51 determines whether or not a field is detected at step 1203. If a field is not detected, control is transferred to step 1206 in which the MPU 51 sets up a flag F. That is, the flag F (="1") means that the cursor cannot move due to the absence of a destination.

If the determination at step 1203 is affirmative, control is transferred to step 1204, in which the MPU 51 sets the initial location of the cursor. In the case of a character field, the MPU 51 writes the first relative coordinates thereof into the cursor location area 615 (or 615'). In the case of a numeric field, the MPU 51 writes the relative coordinates of the first digital place thereof into the cursor location area 615 (or 615'). Then, control is transferred to step 1205, in which the cursor is displayed. The step 1205 will be explained later with reference to FIGS. 16A and 16B. At step 1209, the MPU 51 removes the flag F.

Figure 11:
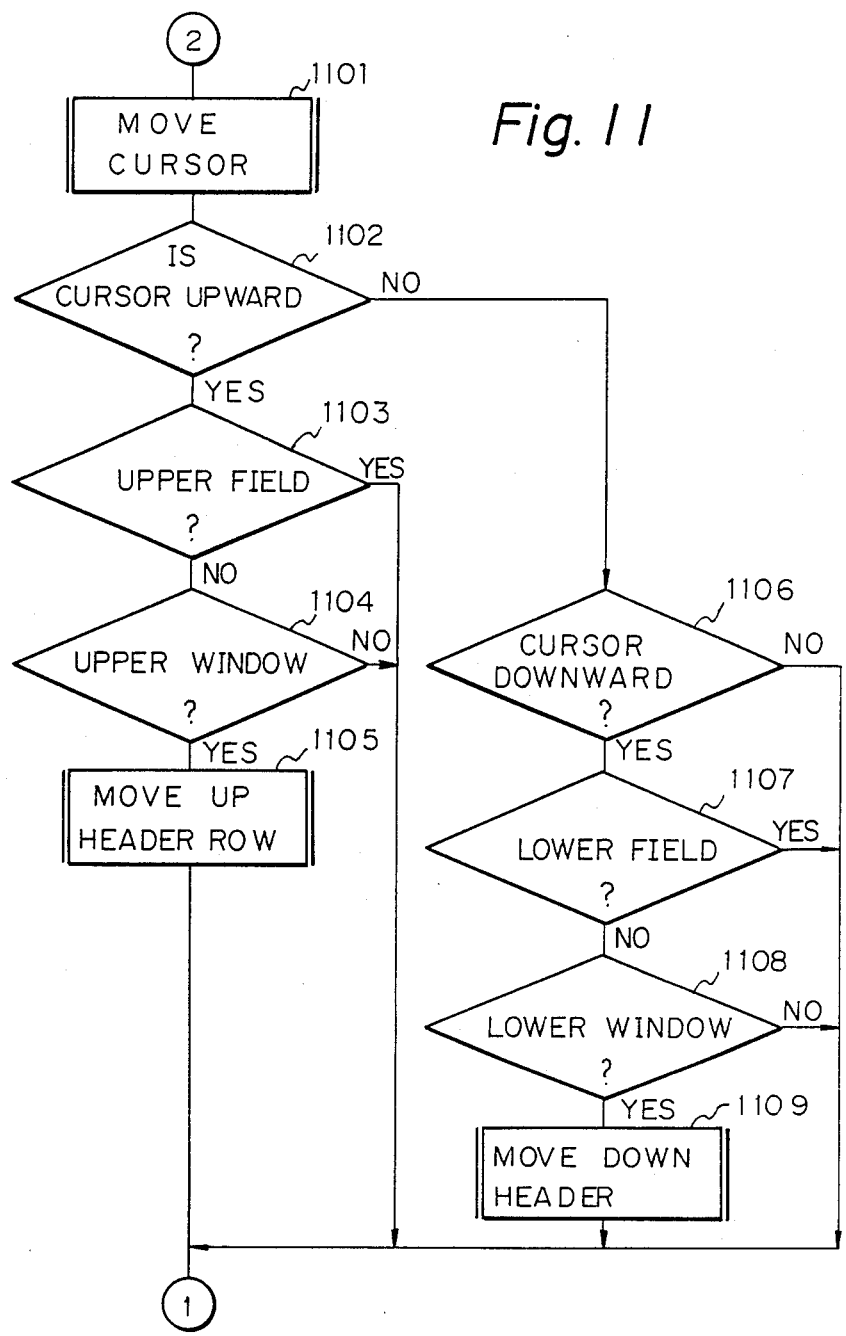
Figure 12:
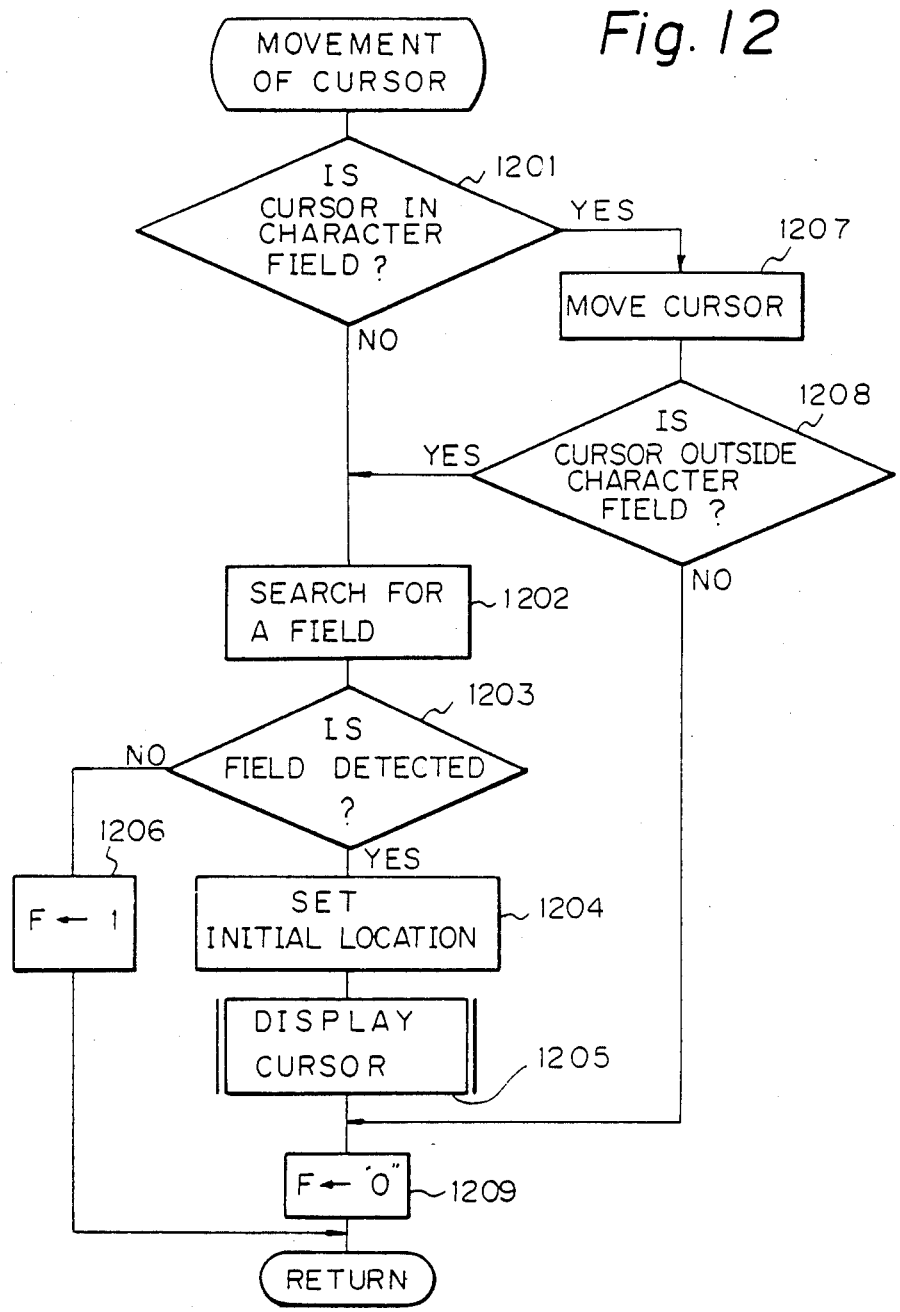

Note that the flag F is used in steps 1103 and 1107 of FIG. 11.

Step 1105 of FIG. 11 will be explained in more detail with reference to FIGS. 13A-1 and 13A-2. At step 1301, the MPU 51 determines whether or not the cursor is on the header row (boundary row). At step 1302, the MPU 51 determines whether or not the cursor is on a row next to, and lower than the header row. Now, assume that the cursor is far away from and lower than the header row. Then, control is transferred from steps 1301 and 1302 to step 1303, in which the cursor is moved up. Then, at step 1304, the MPU 51 determines whether or not the cursor key is still being pushed. If still pushed, control returns to step 1301. Next, assume that the cursor reaches the row immediately below the header row. In this case, control is transferred to step 1306, in which the MPU 51 determines whether or not the first row of a card image displayed in the lower window, such as NO. 2 of FIG. 8C, is on the row immediately below the header row. If the above-mentioned first row is not on the row immediately below the header row, control is transferred to step 1307, in which the window NO. 2 is scrolled down. If the cursor key is still being pushed, the above-mentioned first row finally reaches the row immediately below the header row. In this case, control is transferred from step 1304 through steps 1301, 1302, and 1306 to step 1308, in which the cursor is displayed on the header row. Even in this state, if the cursor key is still being pushed, control is transferred from step 1304 through step 1301 to step 1309. At step 1309, the MPU 51 moves up the header row, i.e., enlarges the window NO. 2. Of course, in this case, the window NO. 1 is reduced. If the determination at step 1304 is negative, control is transferred to step 1305, in which the cursor is displayed at the previous location. Thus, the routine of FIGS. 13A-1 and 13A-2 is completed.

Step 1109 of FIG. 11 will be explained in more detail with reference to FIGS. 13B-1 and 13B-2 which are similar to FIGS. 13A-1 and 13A-2. At step 1301', the MPU 51 determines whether or not the cursor is on the header row. At step 1302', the MPU 51 determines whether or not the cursor is on a row next to and above the header row. Now, assume that the cursor is far away from and above the header row. Then, control is transferred from steps 1301' and 1302' to step 1303', in which the cursor is moved down. Then, at step 1304', the MPU 51 determines whether or not the cursor key is still being pushed. If the cursor key is still being pushed, control returns to step 1301'. Next, assume that the cursor reaches the row immediately above the header row. In this case, control is transferred to step 1306', in which the MPU 51 determines whether or not the bottom row of a card image displayed in the upper window, such as NO. 1 of FIG. 8C, is on the row immediately above the header row. If the above-mentioned bottom row is not the row immediately above the header row, control is transferred to step 1307', in which the window NO. 1 is scrolled up. If the cursor key is still being pushed the above-mentioned bottom row finally reaches the row immediately above the header row. In this case, control is transferred from step 1304', through steps 1301', 1302', and 1304', to step 1308', and the cursor is displayed on the header row. Even in this state, if the cursor key is still being pushed, control is transferred from step 1304' through step 1301' to step 1309'. At step 1309', the MPU 51 moves the header row down, i.e., enlarges the window NO. 1. Of course, in this case, the area of window NO. 2 is reduced. If the determination at step 1304' is negative, control is transferred to step 1305' in which the cursor is displayed at the previous location. Thus, the routine of FIGS. 13B-1 and 13B-2 is completed.

Figures 2, 13B:
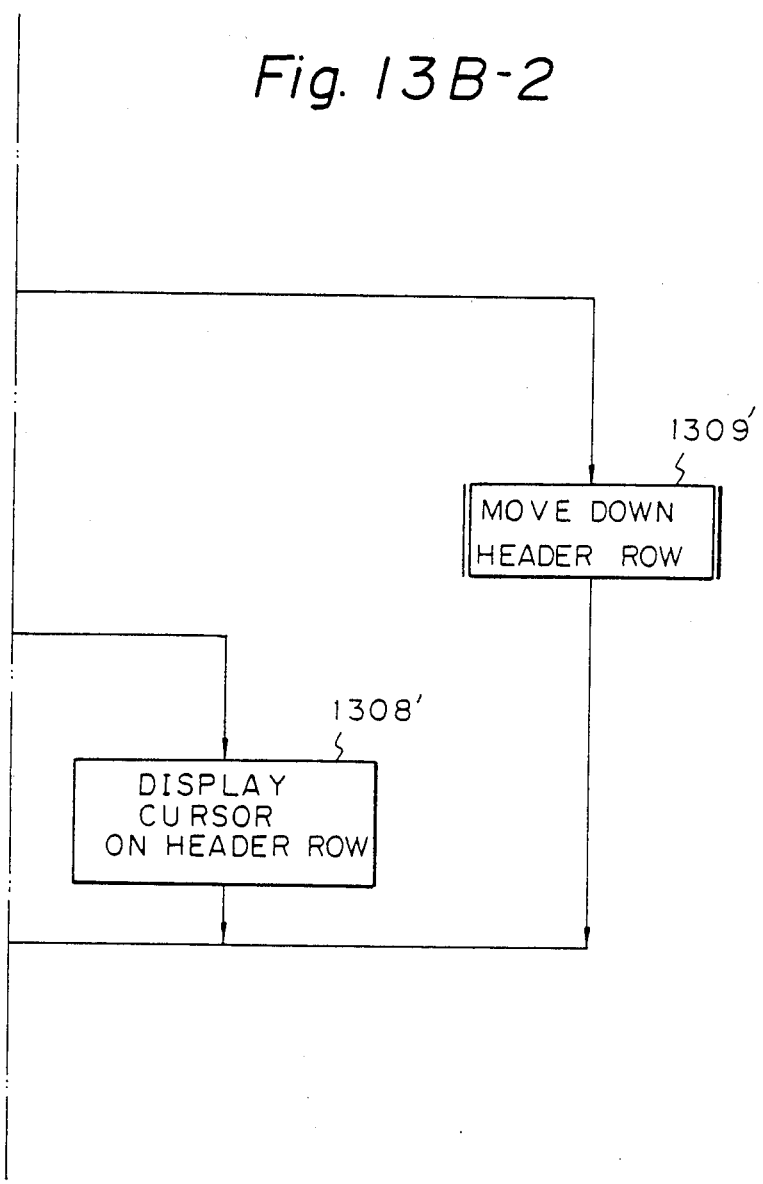
Figure 14:
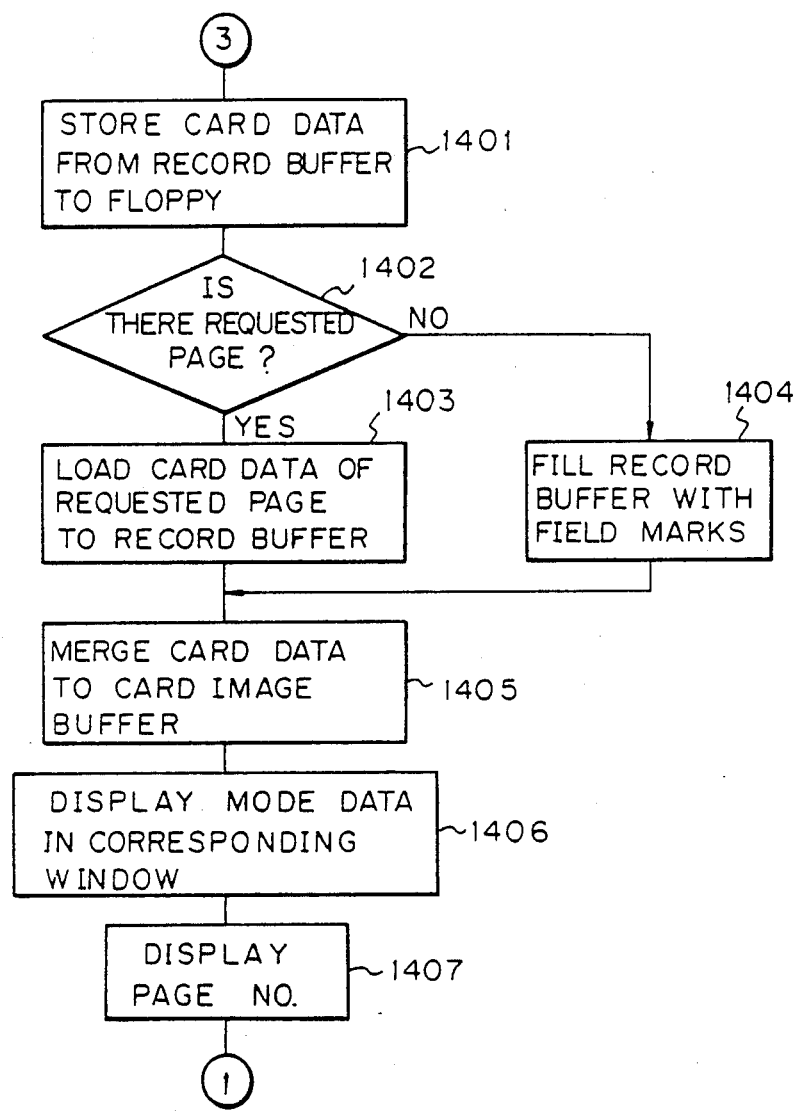
FIGS. 14 and 15A are flowcharts of the operation of the system of FIG. 5.

The header moving-up step 1309 of FIG. 13A-2 and the header moving-down step 1309' of FIG. 13B-2 are similar to each other. The step 1309 will now be explained with reference to FIGS. 13C and 13D. That is, the display picture as indicated by $X_1$ in FIG. 13C is scrolled up by one row. As a result, as illustrated in FIG. 13D, the data "456 . . ." disappears from the display picture. In place of this, a space row indicated by $S_1$ is generated. Therefore, data "XYZ . . ." is transmitted from the card image buffer area to the area of the image buffer 57 corresponding to the space row $S_1$. As a result, regarding the display picture control information, the end row value of the window NO. 1 decreases, and the start row value of the window NO. 2 decreases. Similarly, in step 1309', the display picture as indicated by $X_2$ in FIG. 13E is scrolled down by one row. As a result, as illustrated in FIG. 13F, the data "ABC . . ." disappears from the display picture. In place of this, a space row indicated by $S_2$ is generated. Therefore, data "789 . . ." is transmitted from the card image buffer area to the area of the image buffer 57 corresponding to the space row $S_2$. As a result, regarding the display picture control information, the end row value of the window NO. 1 increases and the start row value of the window NO. 2 increases.

Figure 10B:
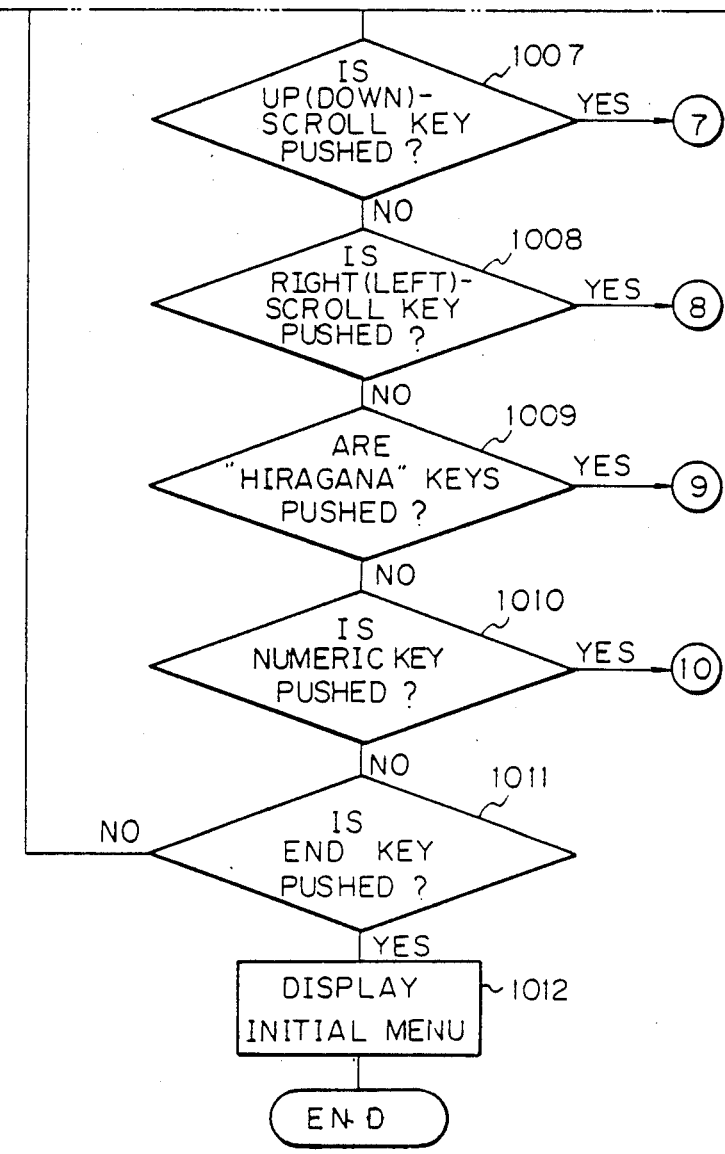

If the determination at step 1002 of FIG. 10 is negative, control is transferred to step 1003, in which the MPU 51 determines whether or not a page key is pushed. If a page Key is pushed, control is transferred to step 1401 of FIG. 14. Note that, in this case, the page key is either a previous page key, a next page key, a page indicating key, or an end page key. At step 1401, the MPU 51 stores card data from the record buffer 608 on the floppy disks 60.

Next, at step 1402, the MPU 51 determines whether or not a requested page is in the floppy disks 60. For example, if the requested page is of a number which is larger than a predetermined value that page is not in the floppy disks 60. If the requested page is in the floppy disks, control is transferred to step 1403, in which the MPU 51 loads the requested page of card data, belonging to an active window such as NO. 1 indicated by the active window number area 61, from the floppy disks 60 to the record buffer 608.

If the determination at step 1402 is negative, control is transferred to step 1404, in which the MPU 51 fills the record buffer with field marks ". . . " or "ᴗᴗᴗ,ᴗᴗᴗ". Then, at step 1405, the MPU 51 merges the content of the record buffer 608 into the card image buffer area 607.

At step 1406, the MPU 51 writes a part of content of the card image buffer area 607 into the image buffer 57 in accordance with the content of the picture control information area 610. Then, at step 1407, the MPU 51 writes the page number into the header row area of the image buffer 57, thereby displaying the page number. Note that a page number requested by a page key is stored in the page number area 609. Therefore, if a page key is pushed, the content of the page number area 609 is renewed. Control then returns to step 1001 of FIG. 10.

If the determination at step 1003 of FIG. 10 is negative, control is transferred to step 1004, in which the MPU 51 determines whether or not a window switching key is pushed. If the window switching key is pushed, control is transferred to step 1501 of FIG. 15A. At step 1501, the MPU 51 determines whether or not there is only one window in the display picture. In this case, the MPU 51 searches the window open areas 601, 601', ---. If there is only one window in the display picture, control returns to step 1001 of FIG. 10.

If there is more than one window in the display picture, control is transferred step 1502, in which the MPU 51 determines whether or not there is a window which has a larger number than that of the current active window. If there is a window which has a larger number than the number of the current active window the MPU 51 adds +1 to the data of the active window area 61, at step 1503; so that the active window is switched. If the determination at step 1502 is negative, control is transferred to step 1504, in which the MPU 51 writes the smallest number into the active window area 61. Then at step 1504, the MPU 51 displays the cursor at the real cursor location designated by the cursor location area 615 (or 615') of the new active window. In this manner a switching of the active window is performed. Control then returns to step 1001 of FIG. 10.

Figure 15A:
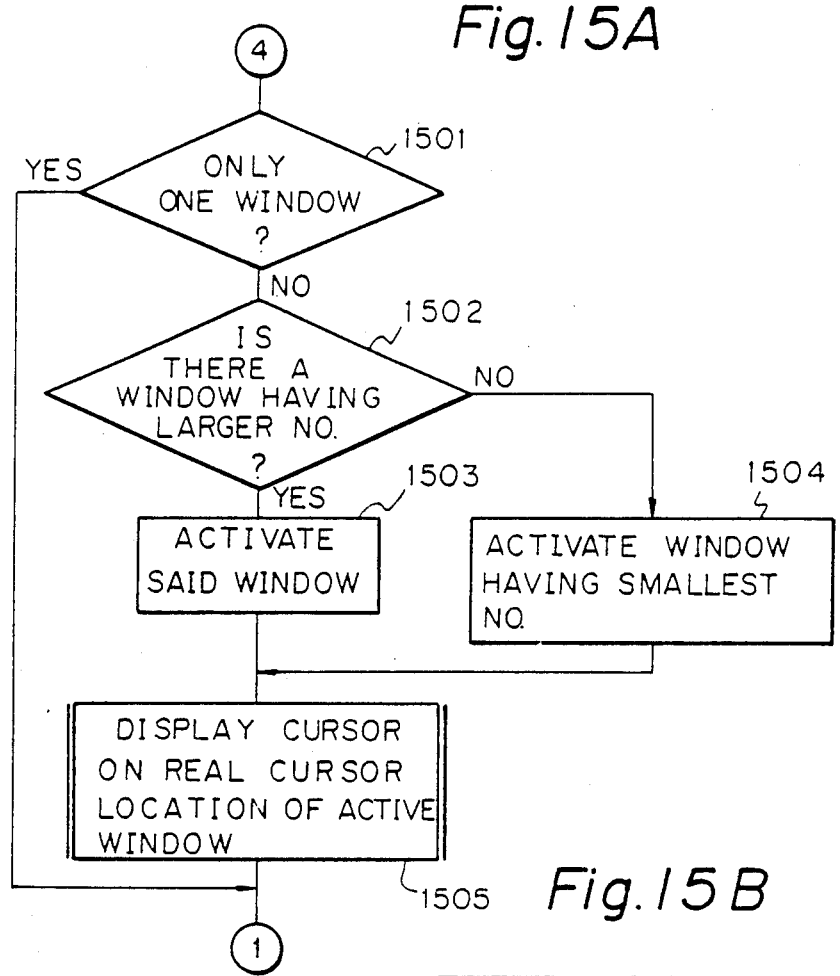
Figure 15B:
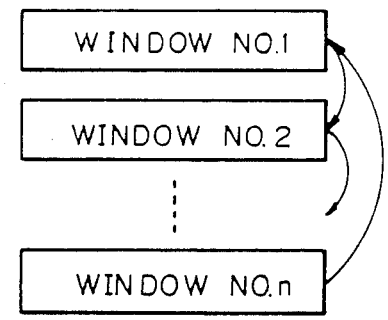
FIG. 15B is a diagram supplementing the flowcharts of FIG. 15A.

When the above-mentioned switching operation of an active window is performed as illustrated in FIG. 15A, it can be understood that the active window number is changed as indicated by arrows in FIG. 15B. Note that the number of windows is n.

Figures 2, 16A:
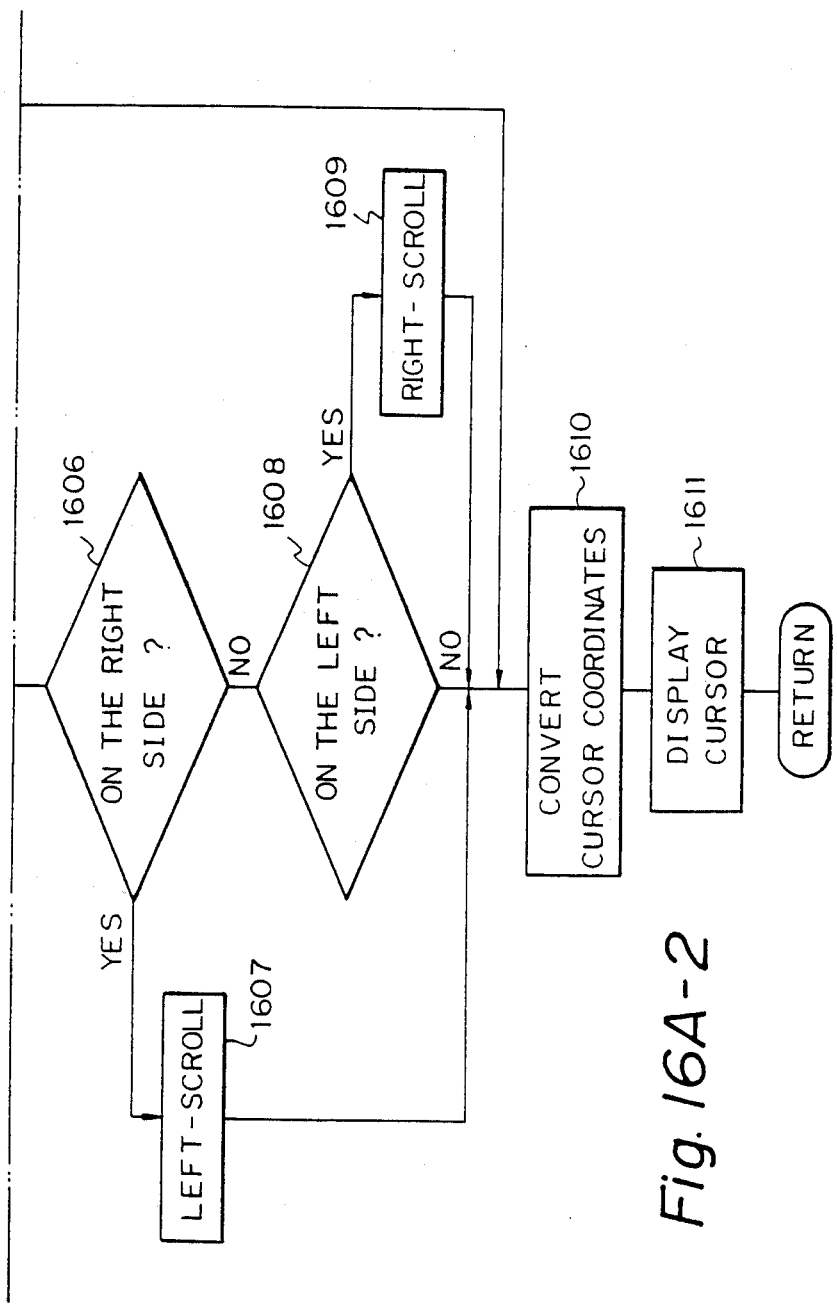
Figure 16B:
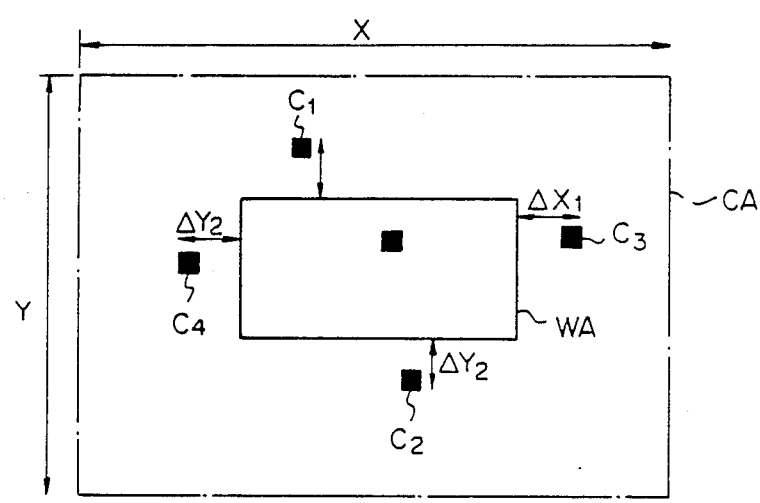
FIG. 16B is a diagram supplementing the flowchart of FIG. 16A.
Figure 17:
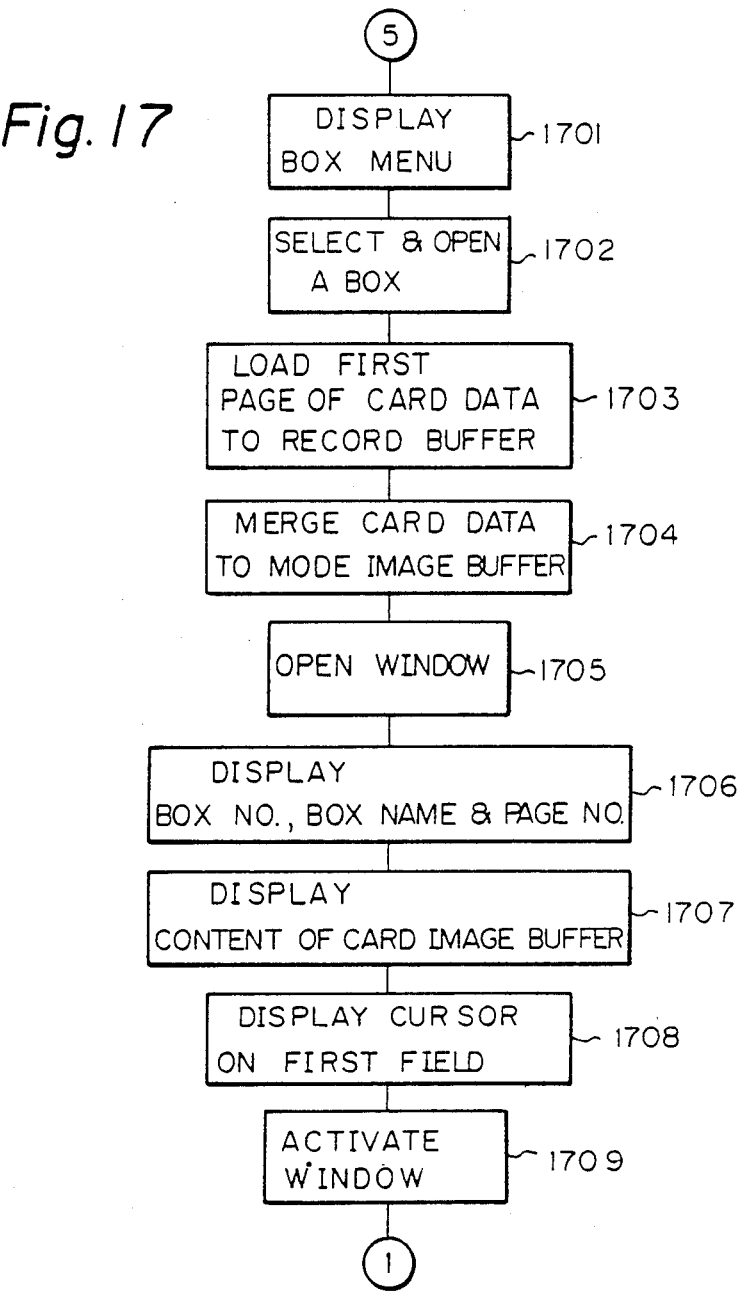
FIGS. 17 through 22 are flowcharts of the operation of the system of FIG. 5.
Figure 18:
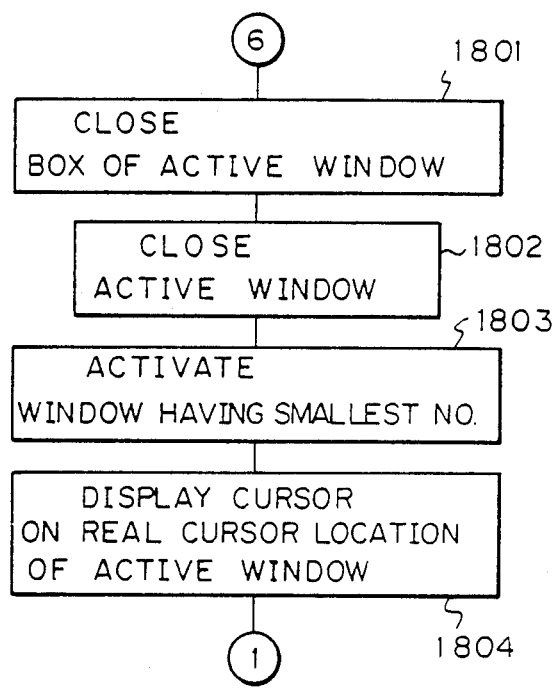
Figure 19:
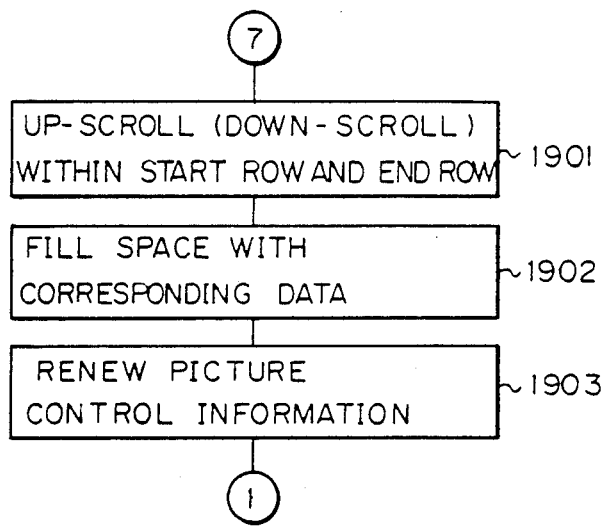
Figure 20:
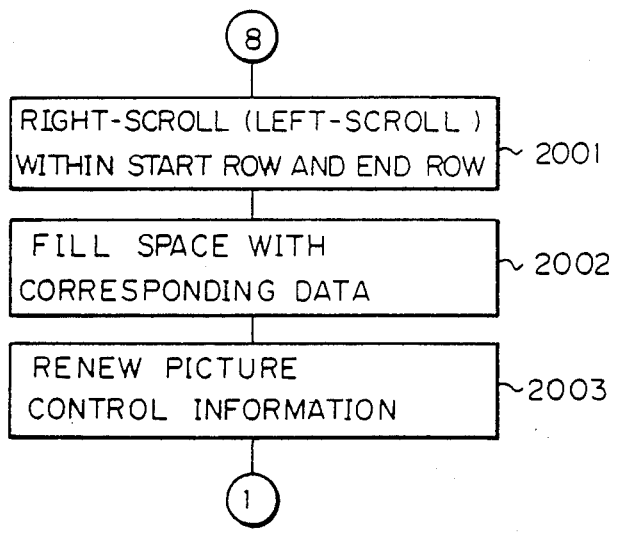
Figure 21:
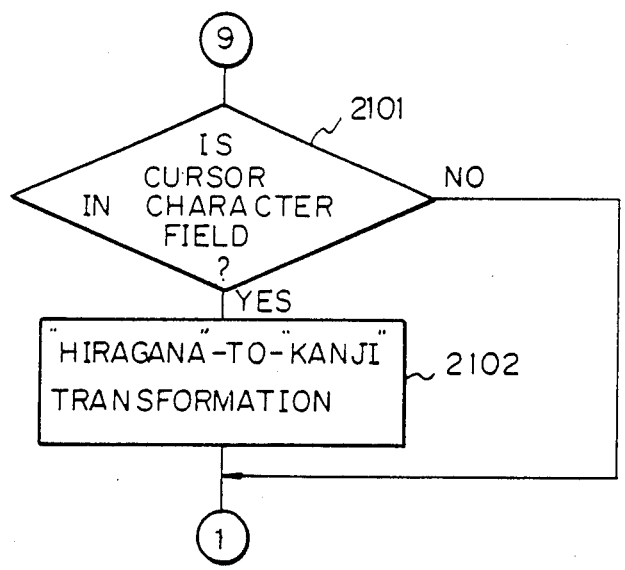
Figure 22:
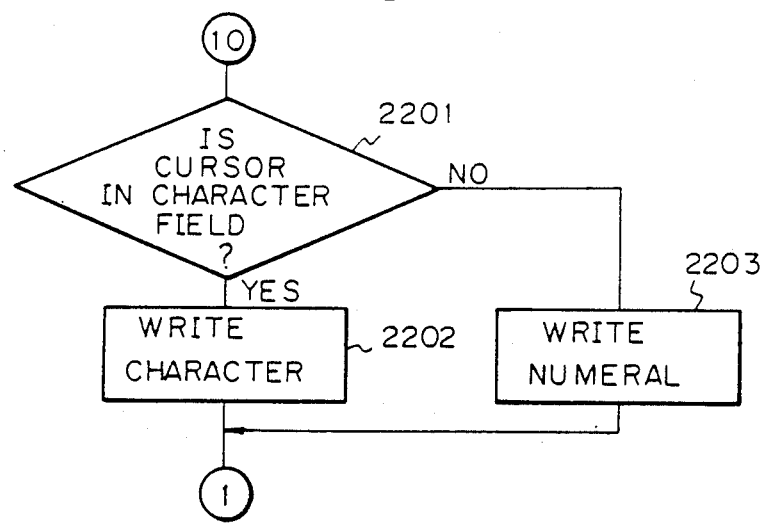

The step 1205 of FIG. 12 or the step 1505 of FIG. 15A will be explained in more detail with reference to FIGS. 16A-1 and 16A-2 and 16B. At step 1601 of FIG. 16A-1, the MPU 51 determines whether or not the cursor is displayed in the display picture. If the cursor is displayed, control is transferred to step 1610. Otherwise, control is transferred to step 1602, in which the MPU 51 determines whether or not the cursor is above a window area. For example, the cursor indicated by $C_1$ is above the window area WA (36 rows×48 columns), as shown in FIG. 16B. Here, note that CA indicates the card image buffer area (60 rows×96 columns).

If the determination at step 1602 is affirmative, control is transferred to step 1603 in which a down-scrolling operation is performed, so that the cursor location reaches the end of the window area WA. If the determination at step 1602 is negative, control is transferred to step 1604, in which the MPU 51 determines whether or not the cursor is below the window area. For example, the cursor indicated by $C_2$ is below the window area WA.

If the determination at step 1604 is affirmative, control is transferred to step 1605, in which an up-scrolling operation is performed, so that the cursor reaches the end of the window area WA. If the determination at step 1604 is negative, control is transferred to step 1606, in which the MPU 51 determines whether or not the cursor is on the right side of the window area. For example, the cursor indicated by $C_3$ is on the right side of the window area WA.

If the determination at step 1606 is affirmative, control is transferred to step 1607, in which a left scrolling operation is performed so that the cursor reaches the end of the window area WA. If the determination at step 1606 is negative, control is transferred to step 1608, in which the MPU 51 determines whether or not the cursor is on the left of the window area. For example, the cursor indicated by $C_4$ is on the left side of the window area WA.

If the determination at step 1608 is affirmative, control is transferred to step 1609, in which a right-scrolling operation is performed, so that the cursor location reaches the end of the window area WA. At step 1610, the MPU 51 converts the relative coordinates of the cursor location into absolute coordinates and writes them into the image buffer 56, thereby displaying the cursor at step 1611. The routine of FIG. 16A is then complete.

If the determination at step 1004 of FIG. 10 is negative, control is transferred to step 1005, in which the MPU 51 determines whether or not a box access key is pushed. If a box access key is pushed, control is transferred to step 1701 of FIG. 17. At step 1701, the MPU 51 displays a menu of boxes. Then, at step 1702, the worker selects and opens a box. That is, the MPU 51 loads the box number, the box name, the box profile information, the field definition information, and the field name information to the corresponding areas of the window NO. 1 or NO. 2.

At step 1703, the MPU 51 loads a first page of card data into the record buffer area 608 (or 608'). Then, at step 1704, the MPU 51 merges the content of the record buffer area 608 (or 608') into the card image buffer area 607 (or 607'). Then, at step 1705, the MPU 51 opens a window, as illustrated in FIG. 8A. At step 1706, the MPU 51 displays the box number, the box name and the page number (in this case, "1") on the header row of the window opened at step 1705. At step 1707, the MPU 51 displays the content of the card image buffer area 607 in the display picture of the display unit 56. Then, at step 1708, the MPU 51 displays the cursor on the first field of the content of the card image buffer area 607. At step 1709, the MPU 51 activates the opened window. Control then returns to step 1001 of FIG. 10.

If the determination at step 1005 of FIG. 10 is negative, control is transferred to step 1006, in which the MPU 51 determines whether or not a box access release key is pushed. If a box access release key is pushed, control is transferred to step 1801 of FIG. 18. At step 1801, the MPU 51 closes a box belonging to the active window. That is, the MPU 51 stores the card data of the record buffer of the active window to the floppy disks 60. In addition, the MPU 51 stores the box profile information of the area 604 (or 604') to the floppy disks 60. Then, at step 1802, the MPU 51 closes the active window, so as to increase the area of the other window. At step 1803, the MPU 51 switches the active window. In this case, the opened window having the smallest window number is activated. At step 1804, the MPU 51 displays the cursor at the cursor location of the new active window. Control then returns to step 1001 of FIG. 10.

If the determination at step 1006 of FIG. 10 is negative, control is transferred to step 1007, in which the MPU 51 determines whether or not an up (down)-scrolling key is pushed. If pushed, control is transferred to step 1901 of FIG. 19. At step 1901, the MPU 51 performs an up(down)-scrolling operation upon the active window within the start row and the end row loaded in areas 611 (or 611') and 612 (or 612'). That is, the header row is not scrolled. However, no up-scrolling operation is performed when the end of the card is displayed, and no down-scrolling operation when the start of the card is displayed.

Note that, as a result of a scrolling operation, a blank space is generated. Therefore, at step 1902, the MPU 51 fills the blank space with the corresponding data of the card image buffer area 607 (or 607'). At step 1903, the MPU 51 renews the picture control information of the active window. That is, the MPU 51 increases the start Y-coordinate value of the area 613 (or 613') in the case of an up-scrolling, while the MPU 51 decreases the start Y-coordinate value in the case of a down-scrolling. Control then returns to step 1001 of FIG. 10.

If the determination at step 1007 of FIG. 10 is negative, control is transferred to step 1008, in which the MPU 51 determines whether or not a right or left scrolling key is pushed. If a right or left scrolling key is pushed, control is transferred to step 2001, of FIG. 20. At step 2001, the MPU 51 performs a right or left scrolling operation upon the active window within the start row and the end row loaded in areas 611 (or 611') and 612 (or 612'). That is, the header row is not scrolled. However, no right-scrolling operation is performed when the left side of the card is displayed, and no left-scrolling operation when the right side of the card is displayed.

Note that, as a result of a scrolling operation, a blank space is generated. Therefore, at step 2002, the MPU 51 fills the blank space with the corresponding data of the card image buffer area 607 (or 607'). At step 2003, the MPU 51 renews the picture control information of the active window. That is, the MPU 51 decreases the start-coordinate value of the area 614 (or 614') in the case of a right-scrolling, while the MPU 51 increases the start X-coordinate value in the case of a left-scrolling. Control then returns to step 1001 of FIG. 10.

If the determination at step 1008 of FIG. 10 is negative, control is transferred to step 1009. In this particular embodiment, there is provided a Japanese language processing function, wherein words are typed in by the phonetic "hiragana" cursive syllables and then, when necessary, "transformed" into the corresponding ideographic "kanji" characters. In step 1009, the MPU 51 determines whether or not "hiragana" keys are pushed. If "hiragana" keys are pushed, control is transferred to step 2101 of FIG. 21, which determines whether or not the cursor is in a character field. The MPU 51 performs a "hiragana"-to-"kanji" transformation upon the "hiragana" inputted into the image buffer 57 only when the cursor is in a character field. As a result, the codes of transformed "kanji" are written into the card image buffer area 607 (or 607'). Simultaneously, the "kanji" are displayed on the display unit 56. Then, control returns to step 1002 of FIG. 10.

If the determination at step 1009 of FIG. 10 is negative, control is transferred to step 1010, in which the MPU 51 determines whether or not a numeric key is pushed. If pushed, control is transferred to step 2201 of FIG. 22. At step 2201, the MPU 51 determines whether or not the cursor is in a character field. If the cursor is in a character field, at step 2202, the MPU 51 writes the numeral as a character into the card image buffer area 607 (or 607'). Otherwise, at step 2203, the MPU 51 writes the codes of the numeral into the card image buffer area 607 (607'). Control then returns to step 1001 of FIG. 10.

If the determination at step 1010 of FIG. 10 is negative, control is transferred to step 1011, in which the MPU 51 determines whether or not an end key is pushed. If an end key is pushed, control is transferred to step 1012, in which an initial menu having a plurality of instructions is displayed on the display unit 56. If end key are not pushed control returns to step 1001 of FIG. 10.

As explained hereinbefore, according to the present invention, the area of a window can be easily increased or decreased.

We claim:

1. A method for automatically sequencing control of each of a plurality of windows when a cursor key, indicating the motion direction of a cursor, is activated, the windows including active and inactive windows, having boundary rows therebetween and being displayed lengthwise on a display unit, a box having plural cards and a card having plural pages, each window displaying part of a page of a card image belonging to a box, each card image including common card mode data for all card images belonging to the same box and individual card data for all card images belonging to the same box and individual card data for each card image, and each card image having a size, the method comprising the steps of:
   (a) determining whether the cursor is in an active window and moving the cursor within the active window in a direction in respone to and as indicated by the activated cursor key if there is a portion of the active window in the selected direction of cursor movement;
   (b) determining when the cursor reaches a boundary row of the active window and performing a scrolling operation upon a card image displayed in the active window responsive to the determination by moving the displayed card image relative to the cursor in the active window while the cursor remains positioned at the boundary row of the active window; and
   (c) determining that the top of the card image has reached the top of the active window and expanding the active window automatically responsive to the determination, and keeping the card image the same size before and after the active window expansion.

2. A method as set forth in claim 1, further comprising the step of changing the card data of said card image displayed in said active window to different card data belonging to the same box.

3. A method as set forth in claim 1, further comprising the steps of:
- changing said active window into a non-active window while leaving unchanged cursor relative coordinates of a card image belonging to a box;
- changing another window into an active window while transforming said cursor relative coordinates of a card image belonging to another box into absolute coordinates in said display unit; and
- displaying said cursor at said absolute coordinates in said display unit.

4. A method as set forth in claim 3, further comprising the step of performing a scrolling operation upon said another active window and displaying said cursor in said another active window.

5. A method as set forth in claim 1, further comprising the steps of:
- displaying a box name at the boundary row of a window, said box name corresponding to the box which is displayed;
- displaying a page number at the boundary row of a window which displays the page of card image, said page number corresponding to the page of the card image which is displayed;
- changing said box name in response to the change of a box; and
- changing said page number in response to the change of a card image.

6. A method as set forth in claim 1, further comprising (d) contracting the inactive window adjacent to the active window automatically during step (c).

* * * * *